(12) United States Patent
Park et al.

(10) Patent No.: US 10,996,988 B2
(45) Date of Patent: May 4, 2021

(54) PROGRAM CODE TRANSFORMATIONS TO IMPROVE IMAGE PROCESSOR RUNTIME EFFICIENCY

(71) Applicant: Google LLC, Mountain View, CA (US)

(72) Inventors: Hyunchul Park, Santa Clara, CA (US); Albert Meixner, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/658,989

(22) Filed: Oct. 21, 2019

(65) Prior Publication Data

US 2020/0050488 A1 Feb. 13, 2020

Related U.S. Application Data

(62) Division of application No. 15/594,517, filed on May 12, 2017, now Pat. No. 10,489,199.

(51) Int. Cl.
*G06F 9/50* (2006.01)
*G06T 1/20* (2006.01)
*G06F 9/48* (2006.01)
*G06T 1/60* (2006.01)

(52) U.S. Cl.
CPC .......... *G06F 9/5005* (2013.01); *G06F 9/4881* (2013.01); *G06T 1/20* (2013.01); *G06T 1/60* (2013.01)

(58) Field of Classification Search
CPC .................................................... G06F 9/5005
See application file for complete search history.

(56) References Cited

U.S. PATENT DOCUMENTS

| | | | |
|---|---|---|---|
| 5,392,071 A | 2/1995 | Richards et al. | |
| 5,523,854 A | 6/1996 | Hornsby | |
| 7,995,067 B2 | 9/2011 | Navon | |
| 2005/0182749 A1 | 8/2005 | Matsui | |
| 2008/0101653 A1 | 5/2008 | Wang | |
| 2008/0273598 A1 | 11/2008 | Shon | |

(Continued)

FOREIGN PATENT DOCUMENTS

| | | |
|---|---|---|
| JP | 2003-256826 | 9/2003 |
| WO | WO 2016171909 | 10/2016 |

OTHER PUBLICATIONS

Gandhi et al. "Scalable Load and Store Processing in Latency Tolerant Processors," Proceedings of the $32^{nd}$ annual international symposium on Computer Architecture, Jun. 2005, 12 pages.

(Continued)

*Primary Examiner* — Sisley N Kim
(74) *Attorney, Agent, or Firm* — Fish & Richardson P.C.

(57) ABSTRACT

A method is described. The method includes constructing an image processing software data flow in which a buffer stores and forwards image data being transferred from a producing kernel to one or more consuming kernels. The method also includes recognizing that the buffer has insufficient resources to store and forward the image data. The method also includes modifying the image processing software data flow to include multiple buffers that store and forward the image data during the transfer of the image data from the producing kernel to the one or more consuming kernels.

20 Claims, 39 Drawing Sheets

(56) References Cited

U.S. PATENT DOCUMENTS

2016/0313980 A1* 10/2016 Meixner ............ G06F 9/30101
2016/0314555 A1 10/2016 Zhu et al.

OTHER PUBLICATIONS

Ragan-Kelly et al. "Decoupling Algorithms from Schedules for Easy Optimization of Image Processing Pipelines," ACM Trans. Graph. 31(4) Jul. 2012, 12 pages.
International Search Report and Written Opinion issued in International Application No. PCT/US2018/013801, dated Aug. 10, 2018, 21 pages.
Invite to Pay Additional Fees and, Where Applicable, Protest Fee, issued in International Application No. PCT/US2018/013801, dated Jun. 20, 2018, 15 pages.
Loc Cudennec et al. "Parallelism Reduction Based on Pattern Substitution in Dataflow Oriented Programming Languages," Procedia Computer Science, vol. 9, Jun. 4, 2012, 10 pages.
Pablo de Oliveira et al. "Reducing memory requirements of stream programs by graph transformations," International Conference on High Performance Computing and Simulation, Jun. 28, 2010, 10 pages.
Vasiljevic et al. "Using butter-to-BRAM mapping approaches to trade-off throughput vs. memory use," 24th International Conference on Field Programmable Logic and Applications, Sep. 2, 2014, 8 pages.
TW Office Action in Taiwanese Appln. No. 107104240, dated Apr. 15, 2019, 11 pages (with English translation).
PCT International Preliminary Report on Patentability issued in International Application No. PCT/US2018/013801, dated Nov. 21, 2019, 13 pages.
JP Office Action in Japanese Application No. 2019-539188, dated Jun. 9, 2020, 4 pages (with English translation).
KR Office Action in Korean Application No. 10-2019-7021659, dated Aug. 12, 2020, 17 pages (with English translation).

* cited by examiner

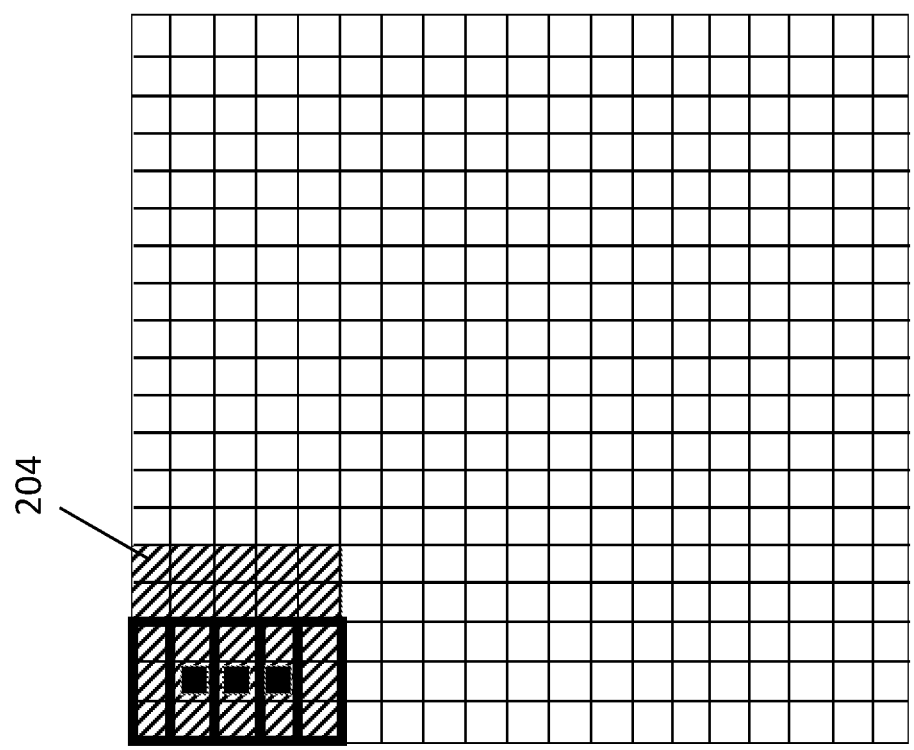

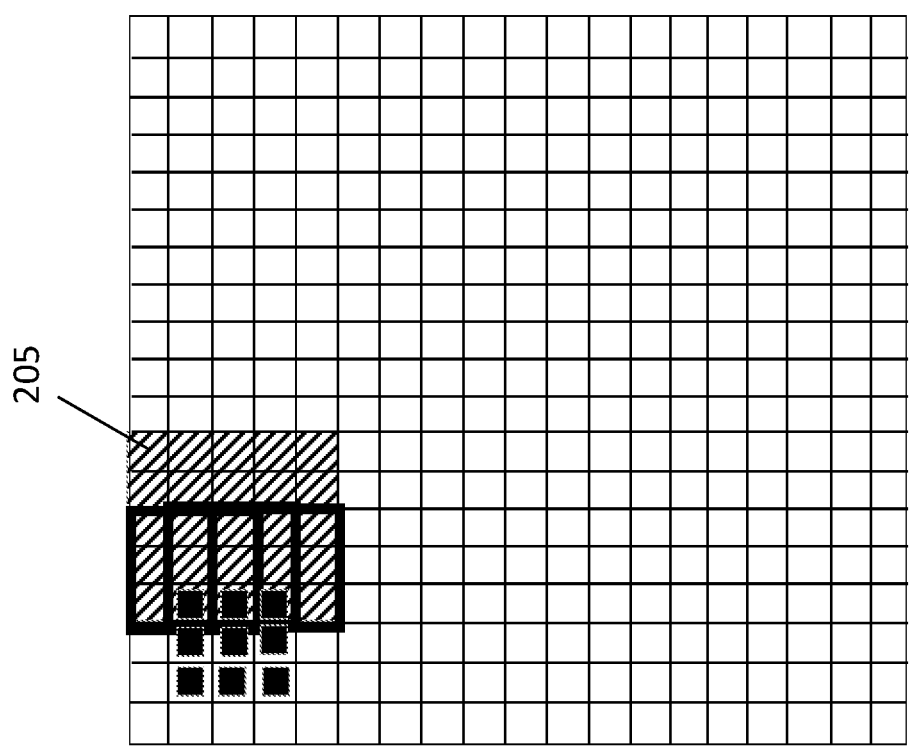

| Scalar Instruction 351 | 2D ALU Instruction 352 | Memory Access Instruction 353 | Immediate Operand 354 |

Fig. 3b

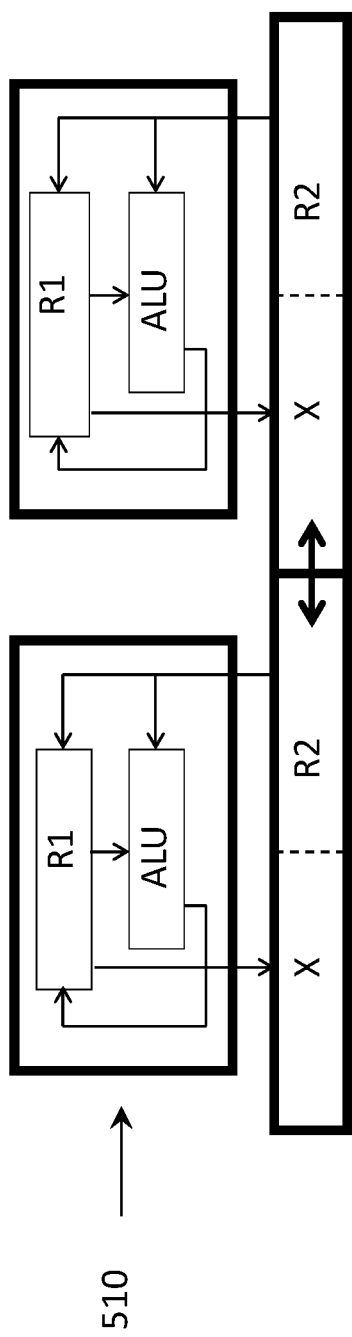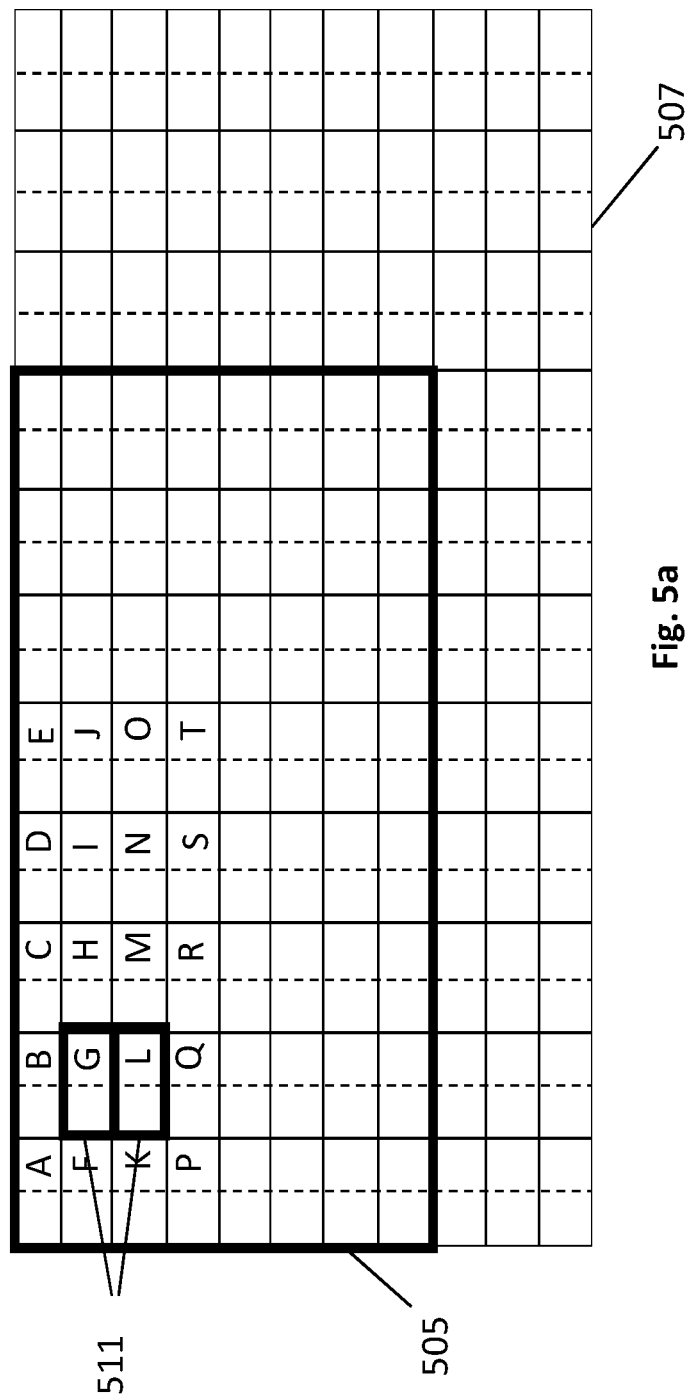
Fig. 5a

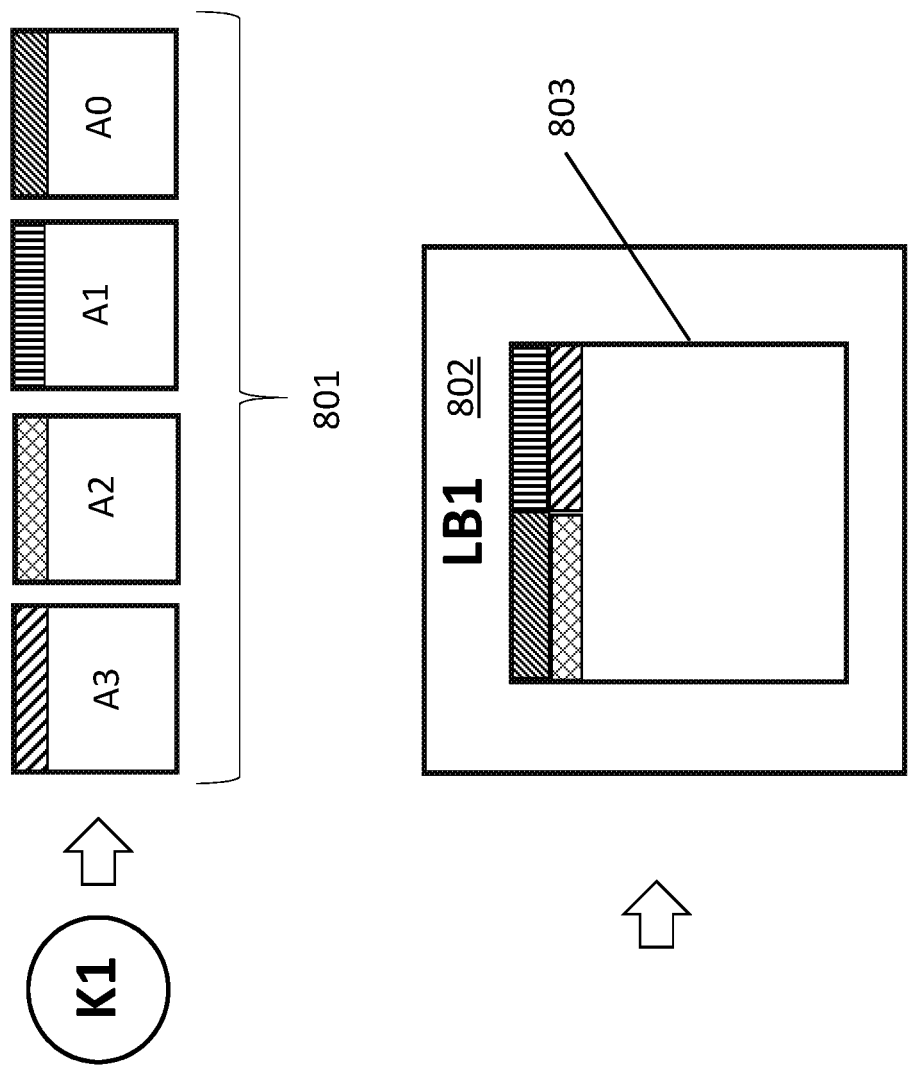

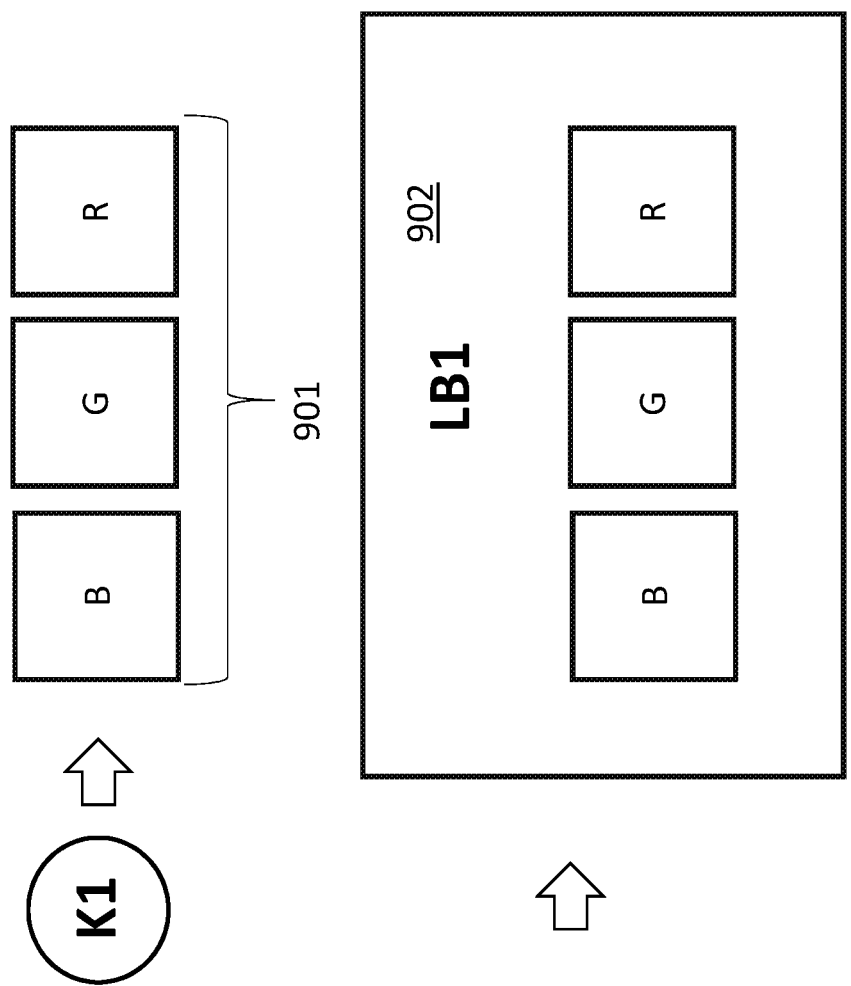

PROGRAM CODE TRANSFORMATIONS TO IMPROVE IMAGE PROCESSOR RUNTIME EFFICIENCY

CROSS-REFERENCE TO RELATED APPLICATIONS

This application is a divisional application of U.S. application Ser. No. 15/594,517, filed May 12, 2017, the contents of which are herein incorporated by reference here.

FIELD OF INVENTION

The field of invention pertains generally to image processing, and, more specifically, to program code transformations to improve image processor runtime efficiency.

BACKGROUND

Image processing typically involves the processing of pixel values that are organized into an array. Here, a spatially organized two dimensional array captures the two dimensional nature of images (additional dimensions may include time (e.g., a sequence of two dimensional images) and data type (e.g., colors). In a typical scenario, the arrayed pixel values are provided by a camera that has generated a still image or a sequence of frames to capture images of motion. Traditional image processors typically fall on either side of two extremes.

A first extreme performs image processing tasks as software programs executing on a general purpose processor or general purpose-like processor (e.g., a general purpose processor with vector instruction enhancements). Although the first extreme typically provides a highly versatile application software development platform, its use of finer grained data structures combined with the associated overhead (e.g., instruction fetch and decode, handling of on-chip and off-chip data, speculative execution) ultimately results in larger amounts of energy being consumed per unit of data during execution of the program code.

A second, opposite extreme applies fixed function hardwired circuitry to much larger blocks of data. The use of larger (as opposed to finer grained) blocks of data applied directly to custom designed circuits greatly reduces power consumption per unit of data. However, the use of custom designed fixed function circuitry generally results in a limited set of tasks that the processor is able to perform. As such, the widely versatile programming environment (that is associated with the first extreme) is lacking in the second extreme.

A technology platform that provides for both highly versatile application software development opportunities combined with improved power efficiency per unit of data remains a desirable yet missing solution.

SUMMARY

A method is described. The method includes constructing an image processing software data flow in which a buffer stores and forwards image data being transferred from a producing kernel to one or more consuming kernels. The method also includes recognizing that the buffer has insufficient resources to store and forward the image data. The method also includes modifying the image processing software data flow to include multiple buffers that store and forward the image data during the transfer of the image data from the producing kernel to the one or more consuming kernels.

FIGURES

The following description and accompanying drawings are used to illustrate embodiments of the invention. In the drawings:

FIGS. 2a, 2b, 2c, 2d and 2e depict the parsing of image data into a line group, the parsing of a line group into a sheet and the operation performed on a sheet with overlapping stencils;

FIG. 3b shows an embodiment of a instruction word of the stencil processor;

FIGS. 5a, 5b, 5c, 5d, 5e, 5f, 5g, 5h, 5i, 5j and 5k depict an example of the use of a two-dimensional shift array and an execution lane array to determine a pair of neighboring output pixel values with overlapping stencils;

Figure 7A:
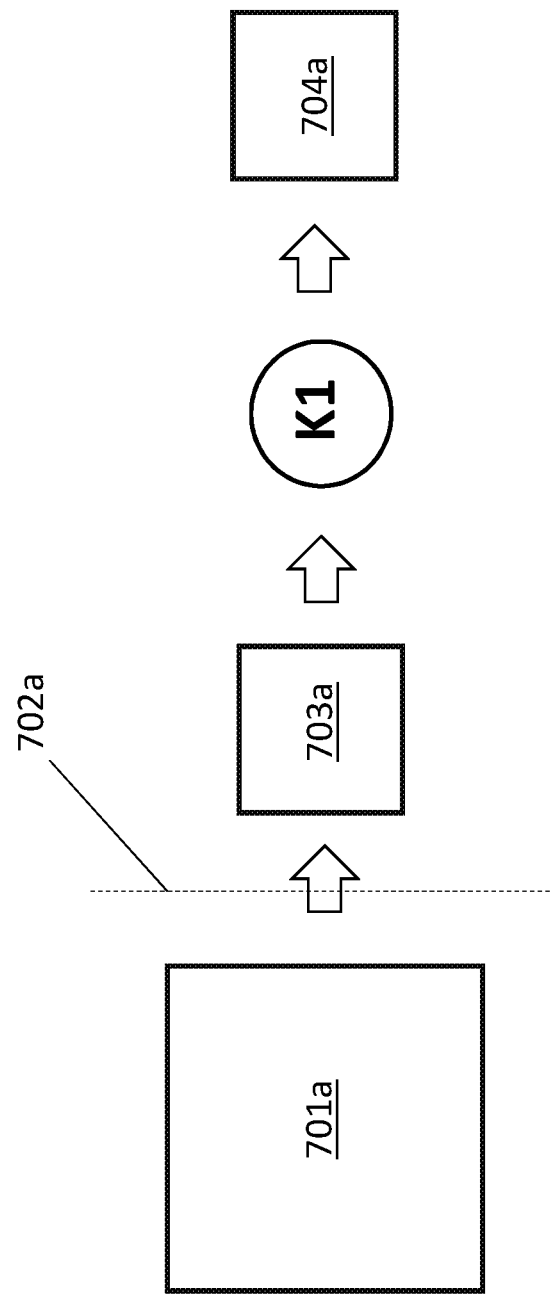
Figure 7B:
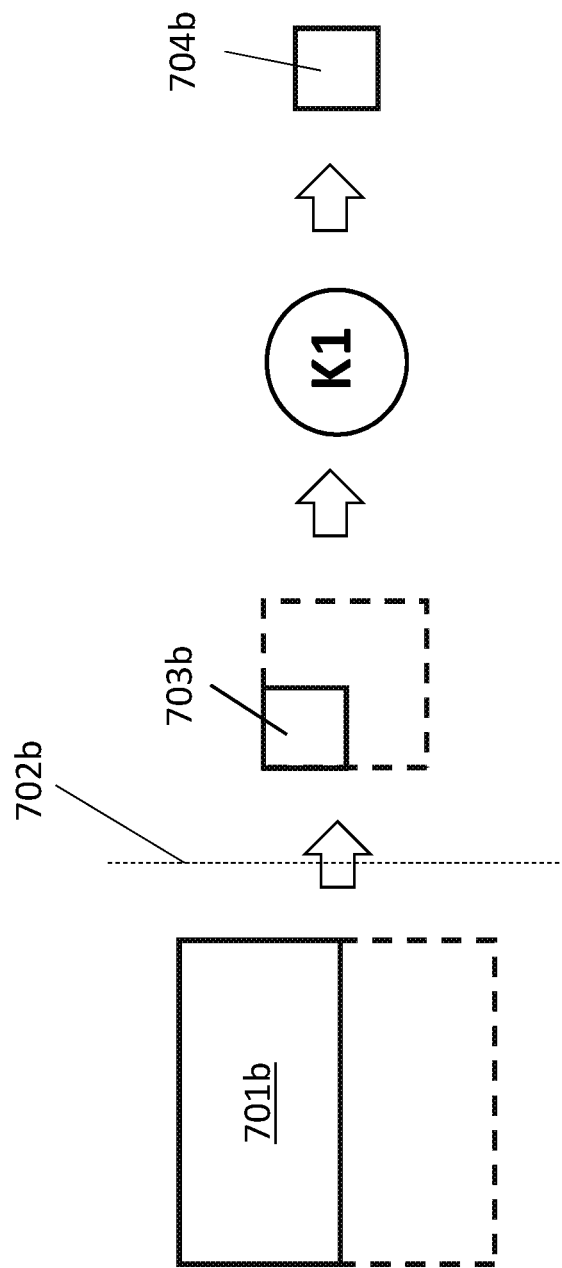
Figure 8B:
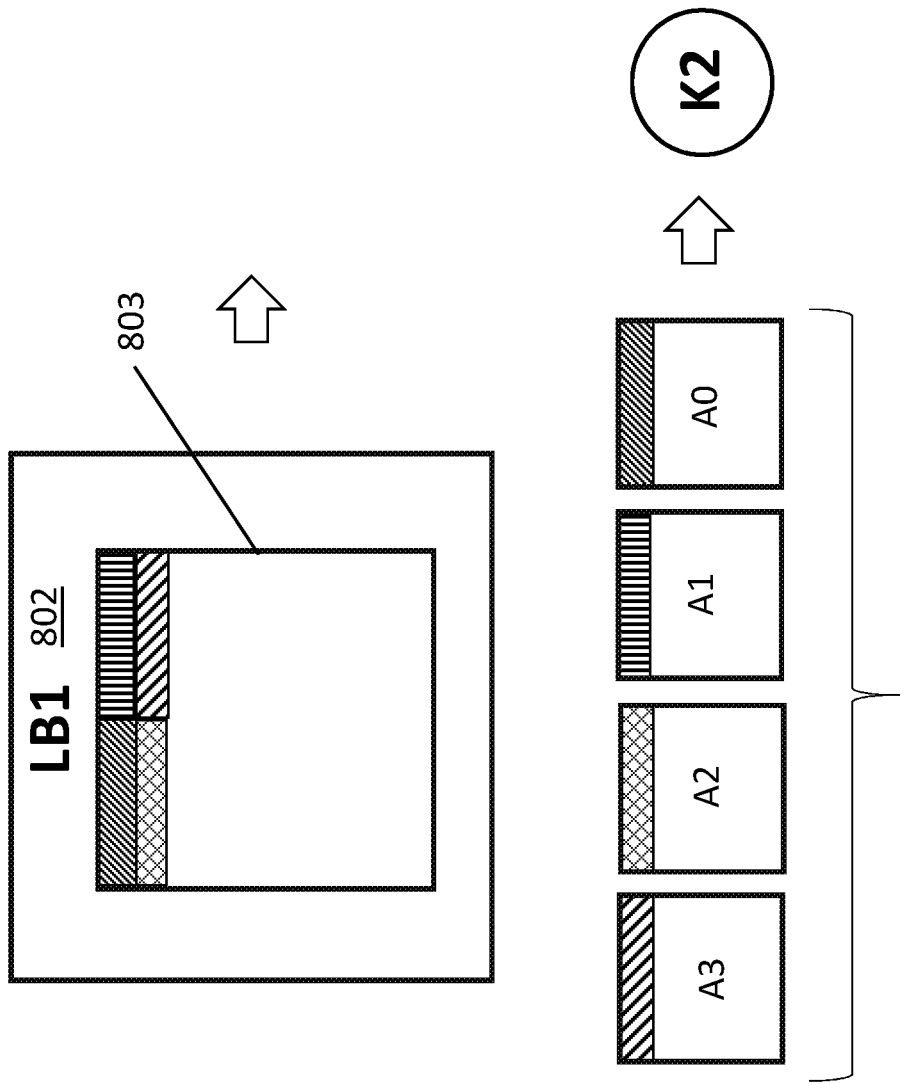
Figure 8C:
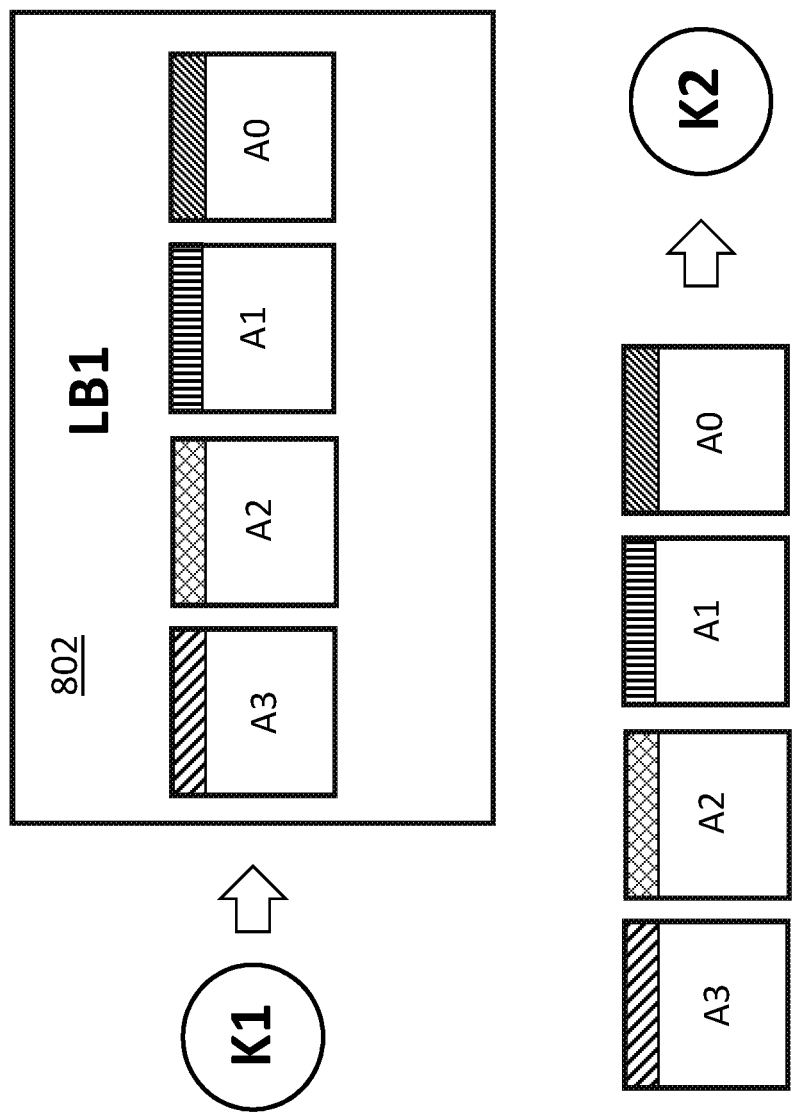
Figure 9B:
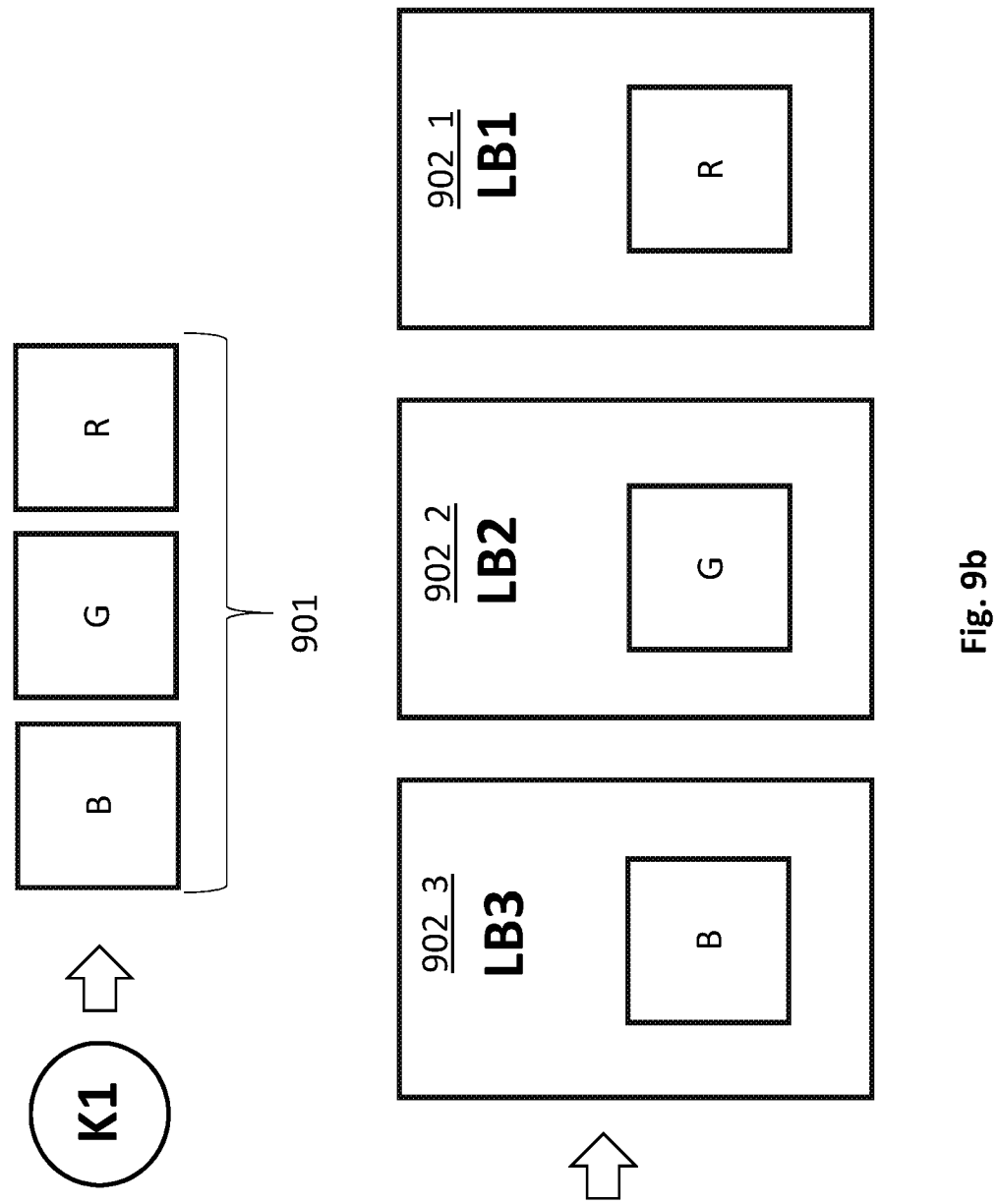
Figure 10A:
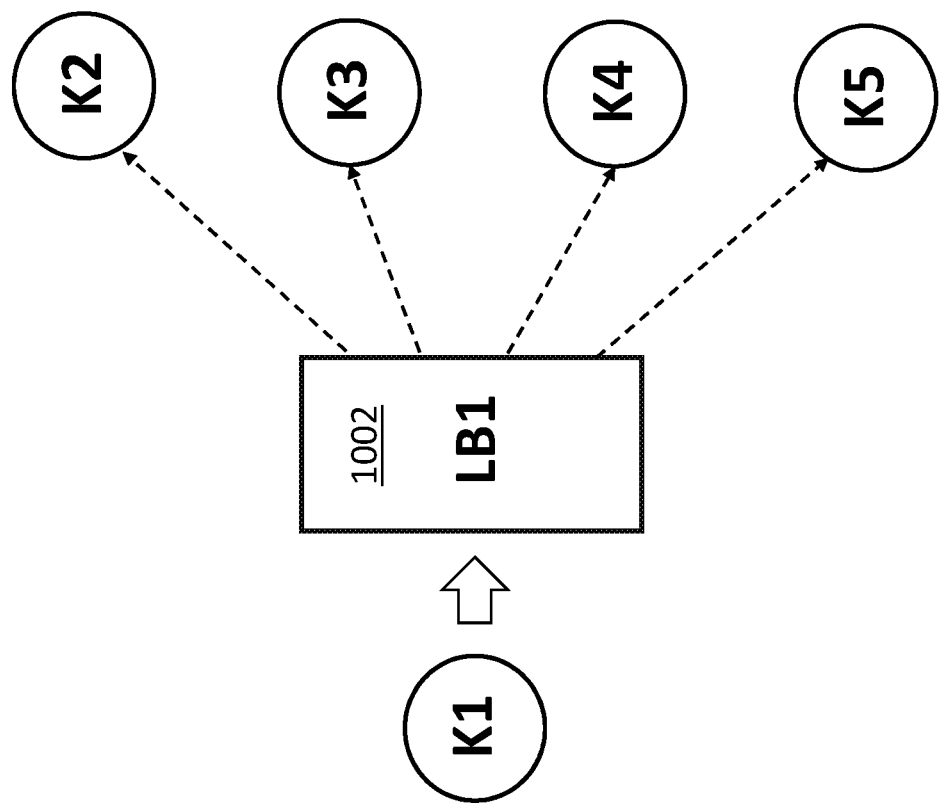
Figure 10B:
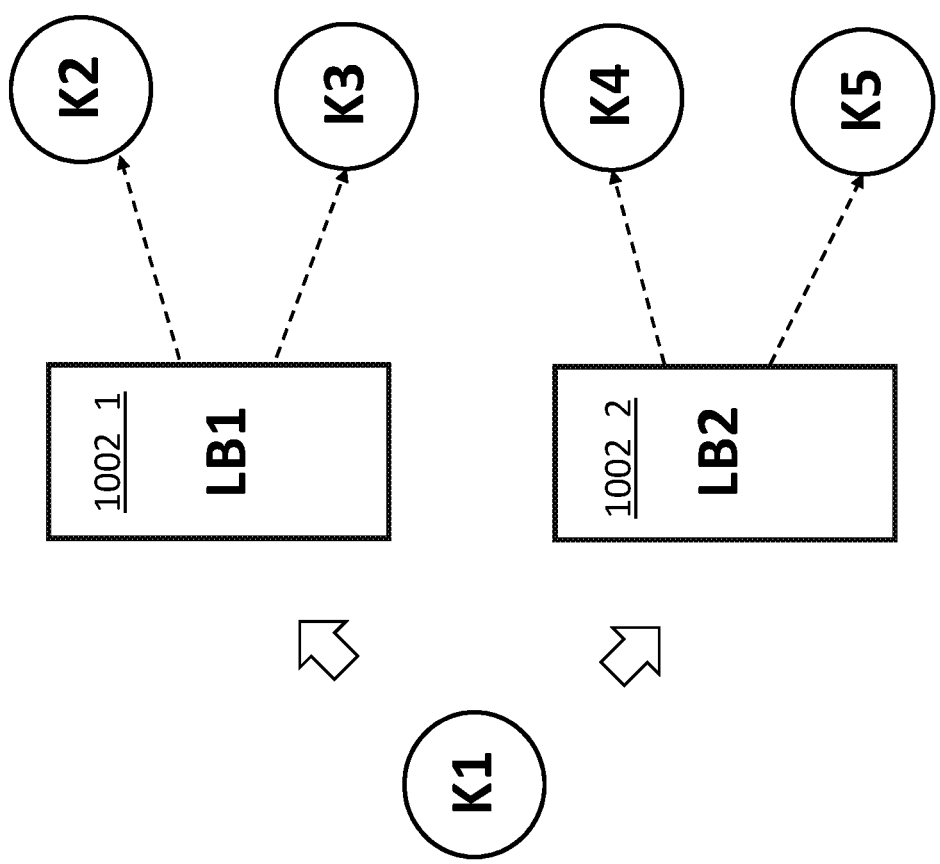
Figure 11A:
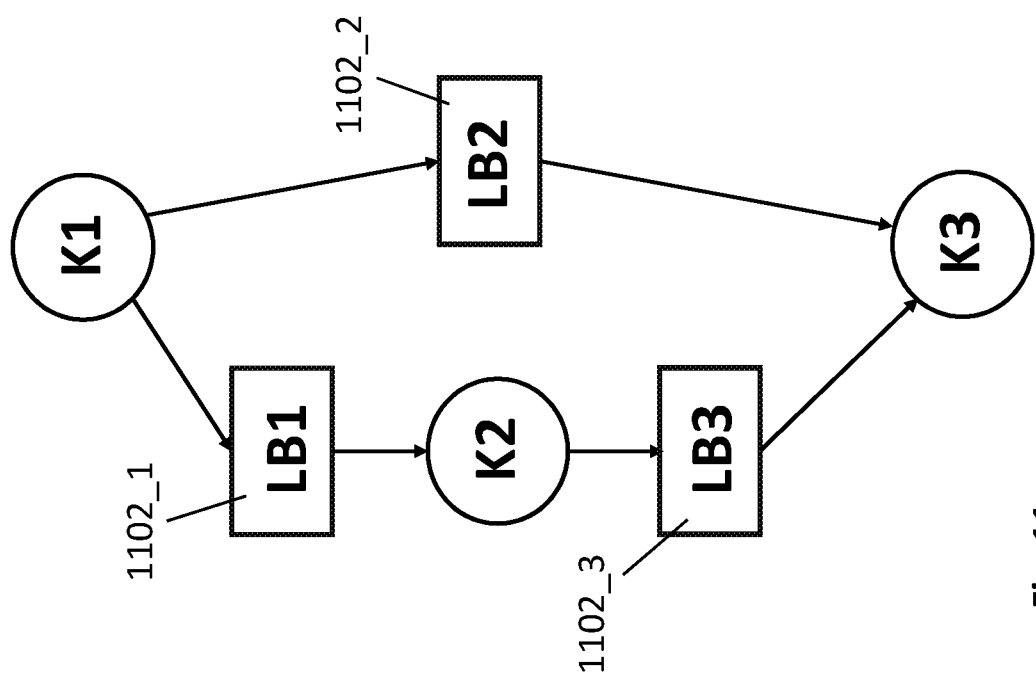
Figure 11B:
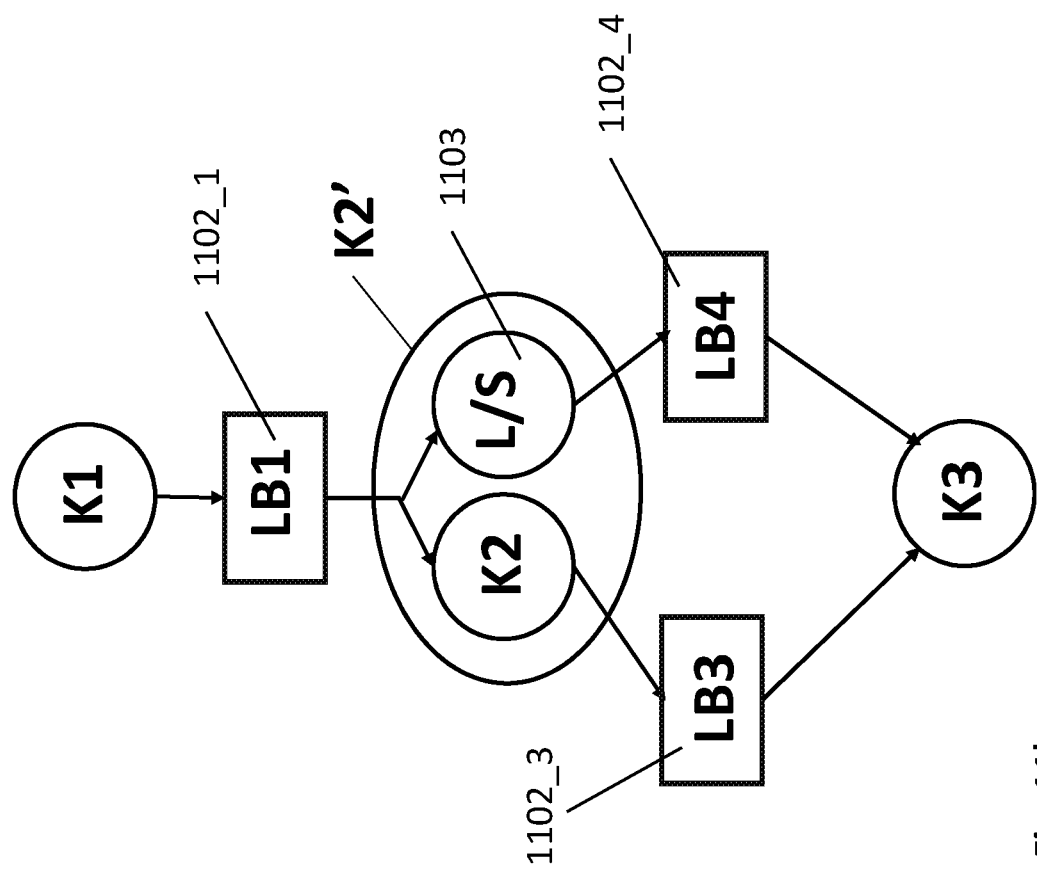
Figure 12:
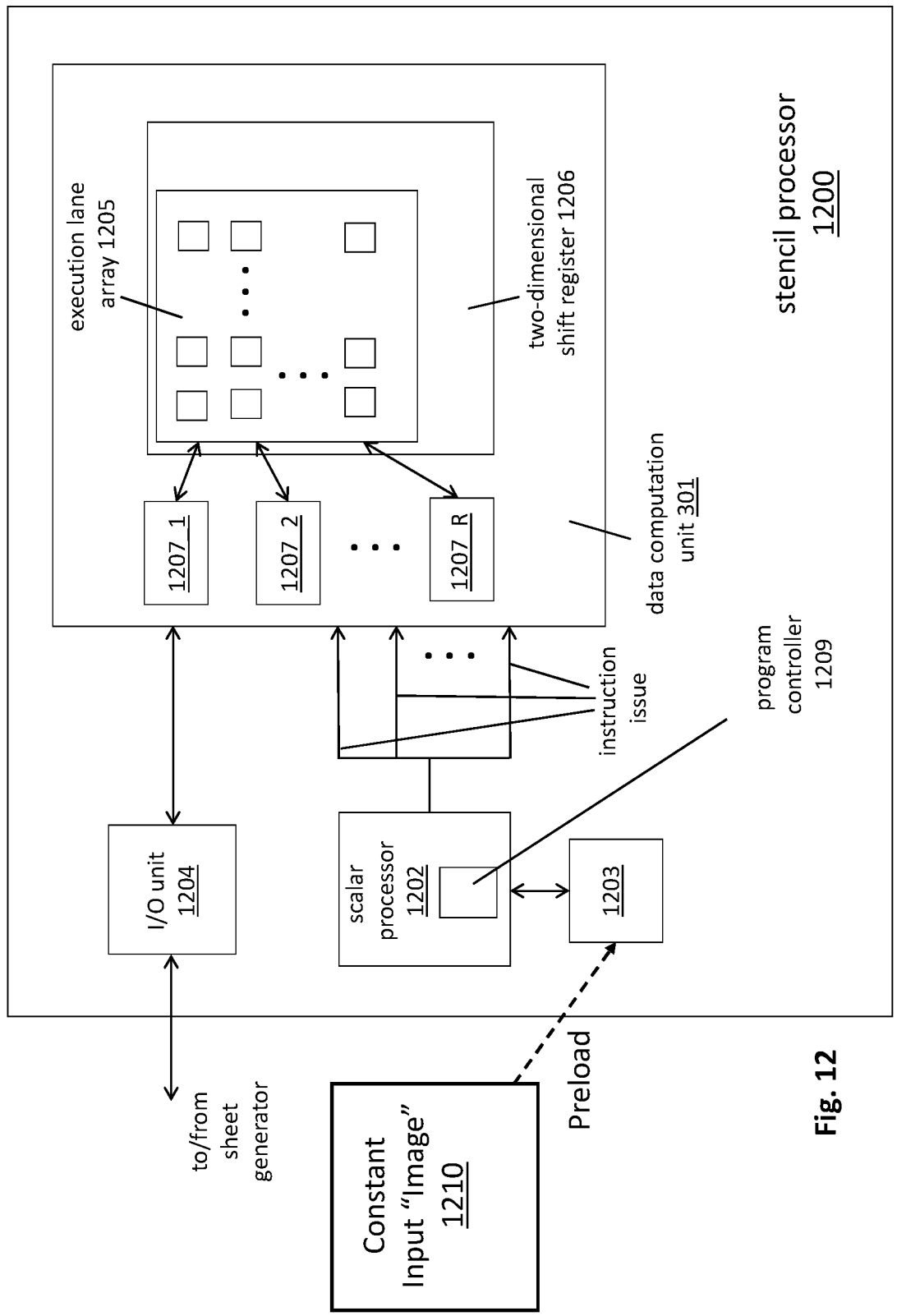
Figure 13A:
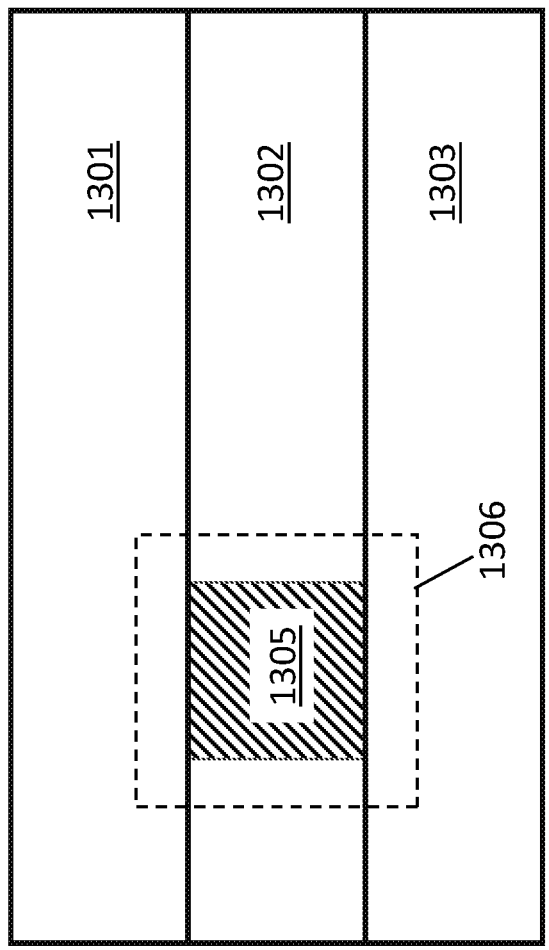
Figure 13B:
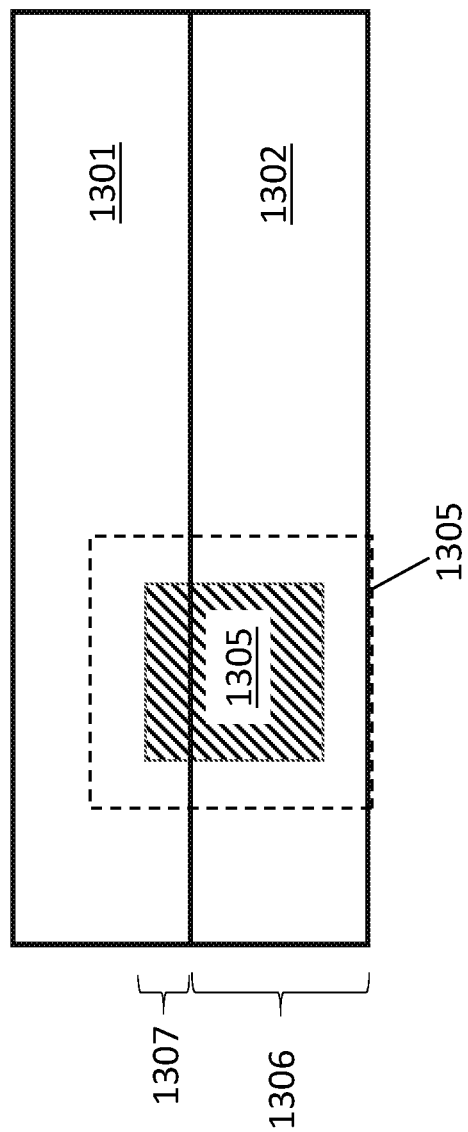
Figure 14:
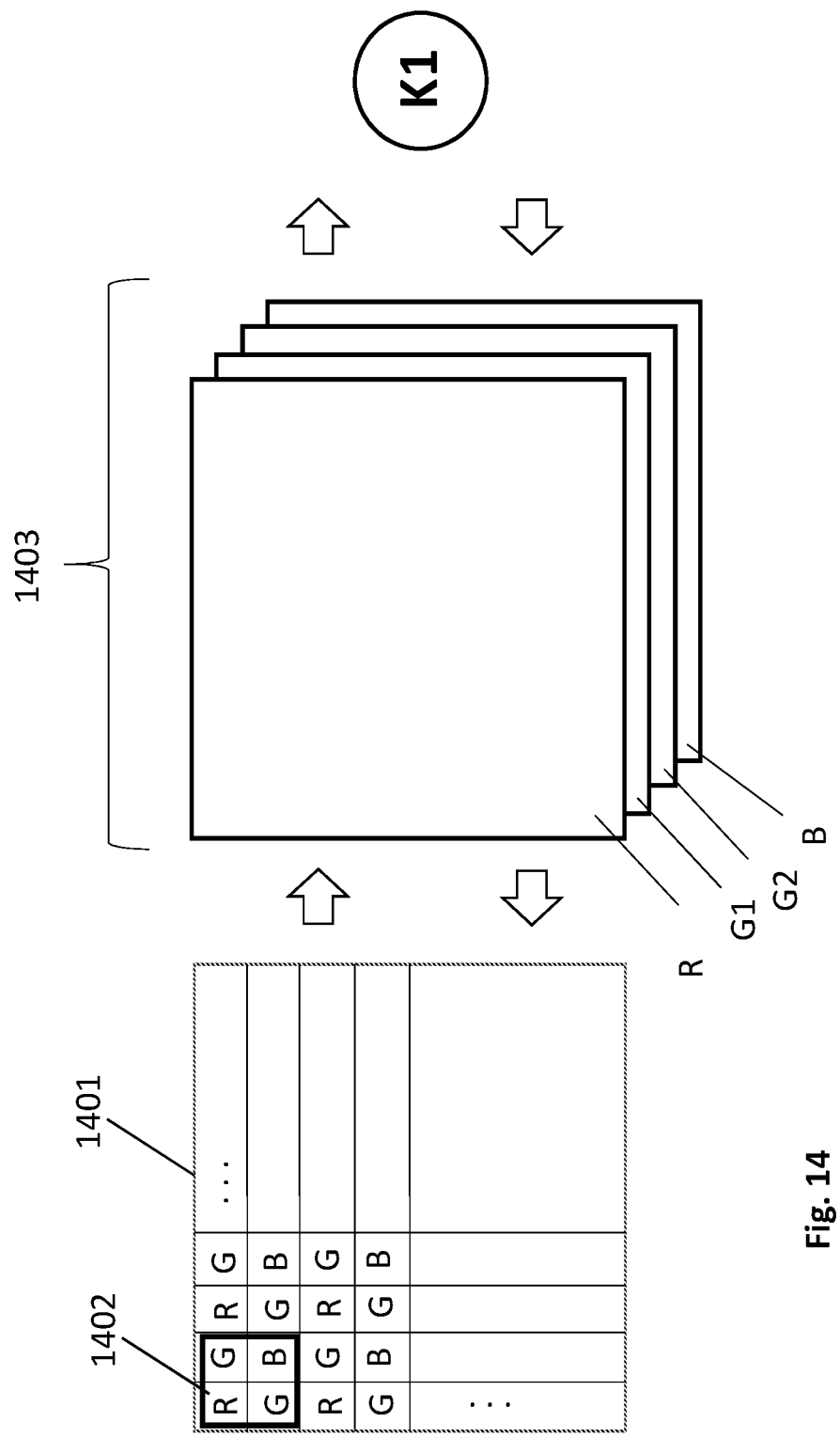
Figure 15:
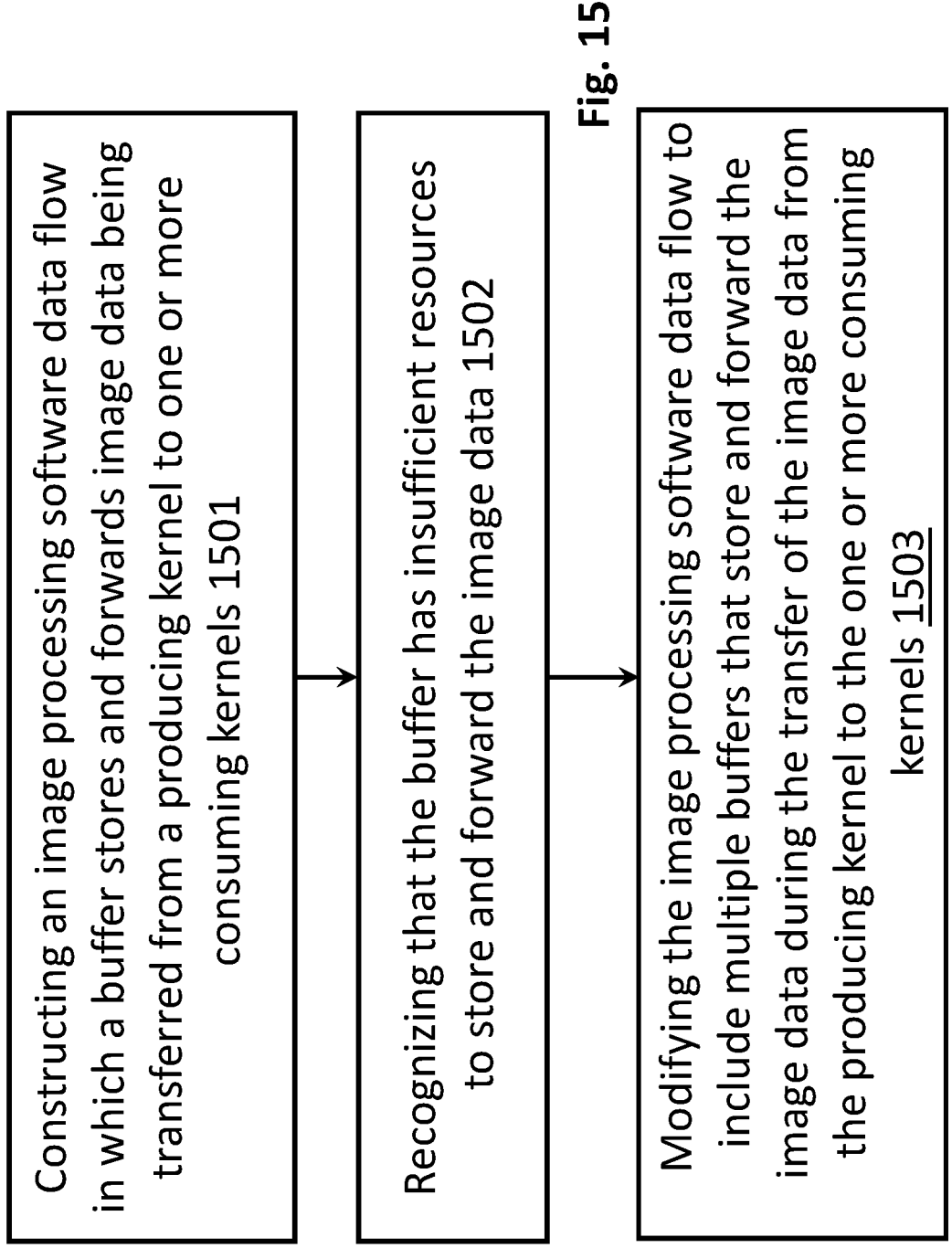

FIGS. 7a and 7b pertain to a first program code transformation;

FIGS. 8a, 8b and 8c pertain to a second program code transformation;

FIGS. 9a and 9b pertain to a third program code transformation;

FIGS. 10a and 10b pertain to a fourth program code transformation;

FIGS. 11a and 11b pertain to a fifth program code transformation;

FIG. 12 pertains to a sixth program code transformation;

FIGS. 13a and 13b pertain to a seventh program code transformation;

FIG. 14 pertains to an eighth program code transformation;

FIG. 15 shows a program code transformation method

Figure 16:
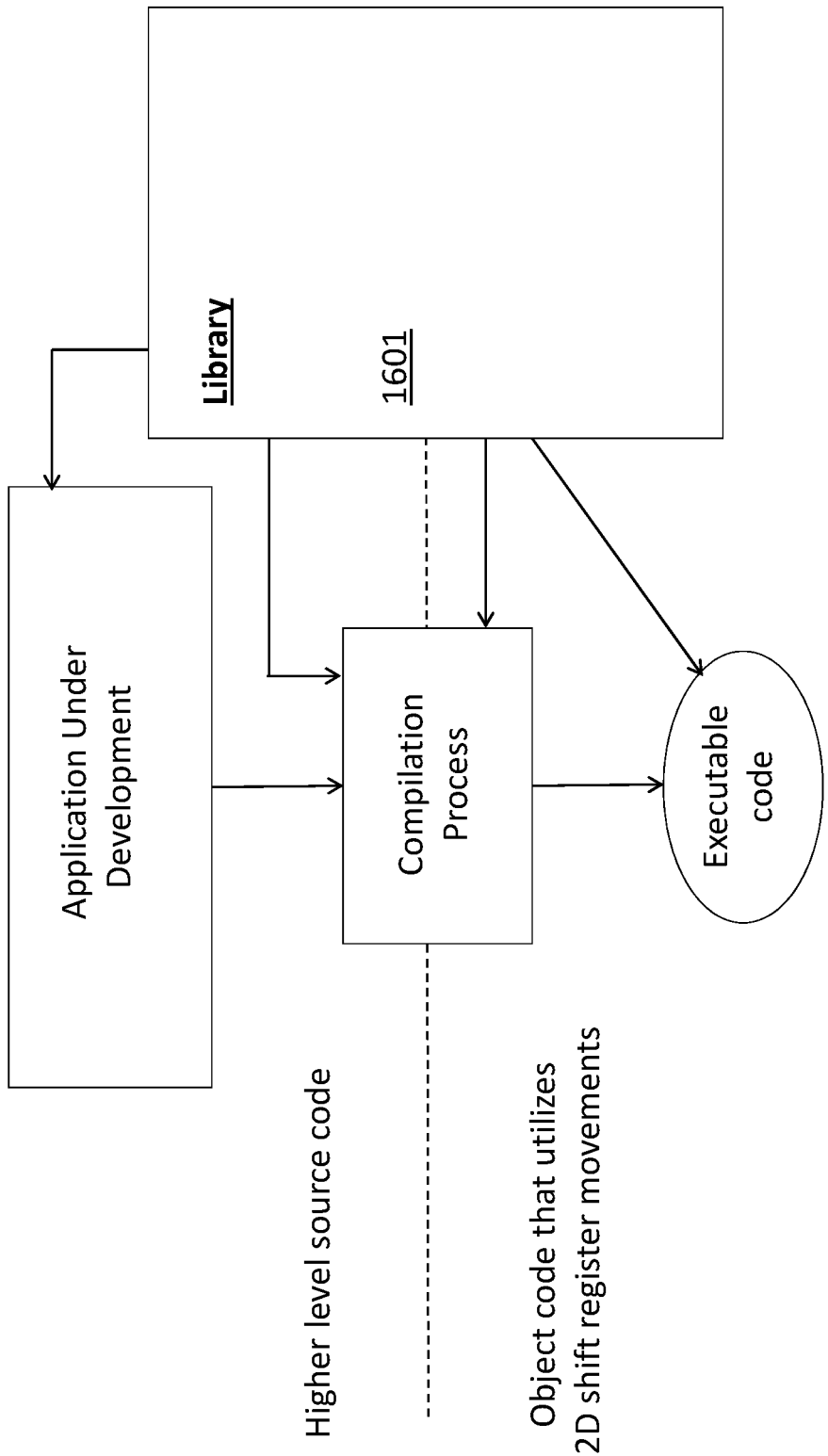
Figure 17:
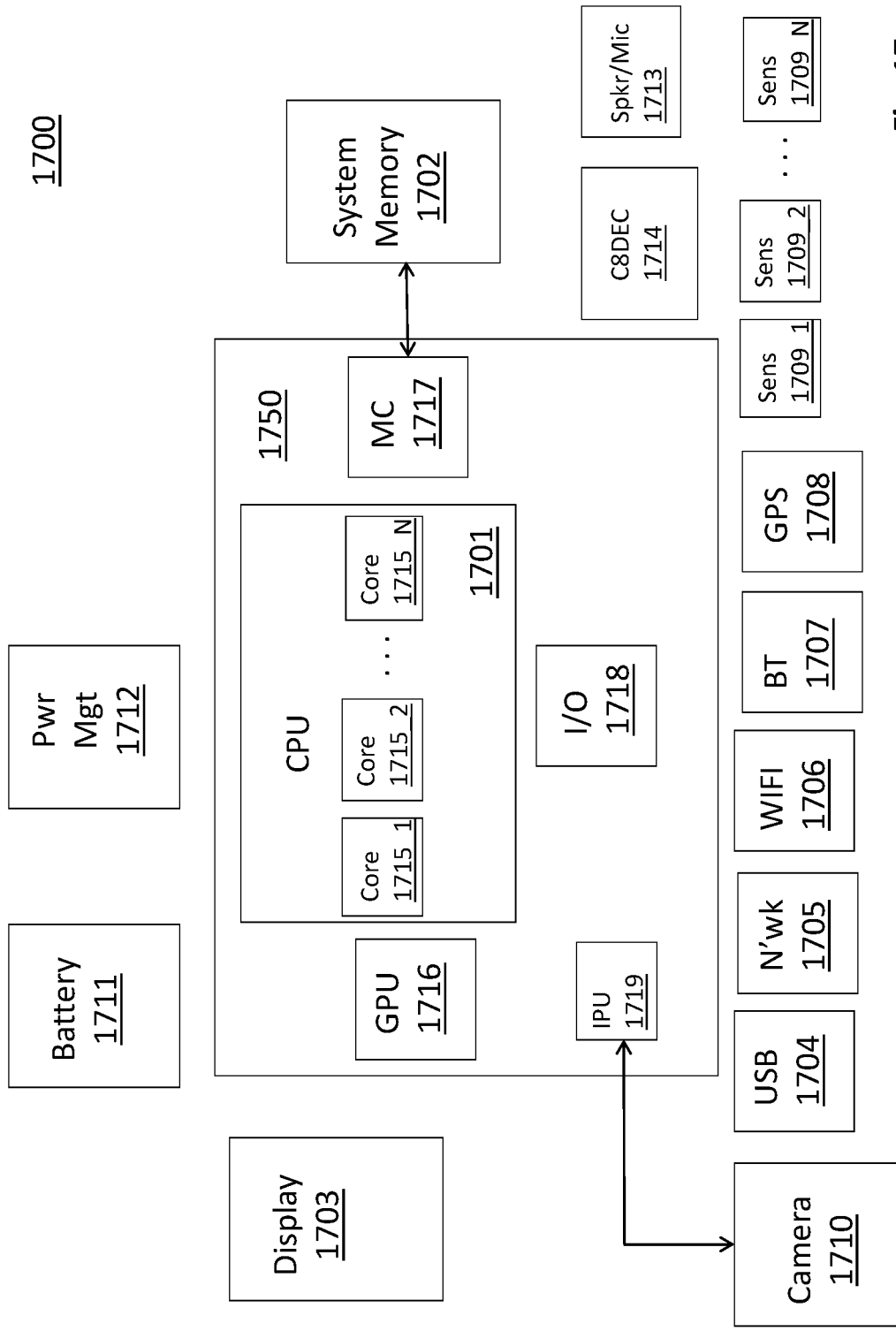

FIG. 16 pertains to a software development environment;

FIG. 17 pertains to a computing system.

DETAILED DESCRIPTION i. Introduction

The description below describes numerous embodiments concerning a new image processing technology platform that provides a widely versatile application software development environment that uses larger blocks of data (e.g., line groups and sheets as described further below) to provide for improved power efficiency.

Figure 1:
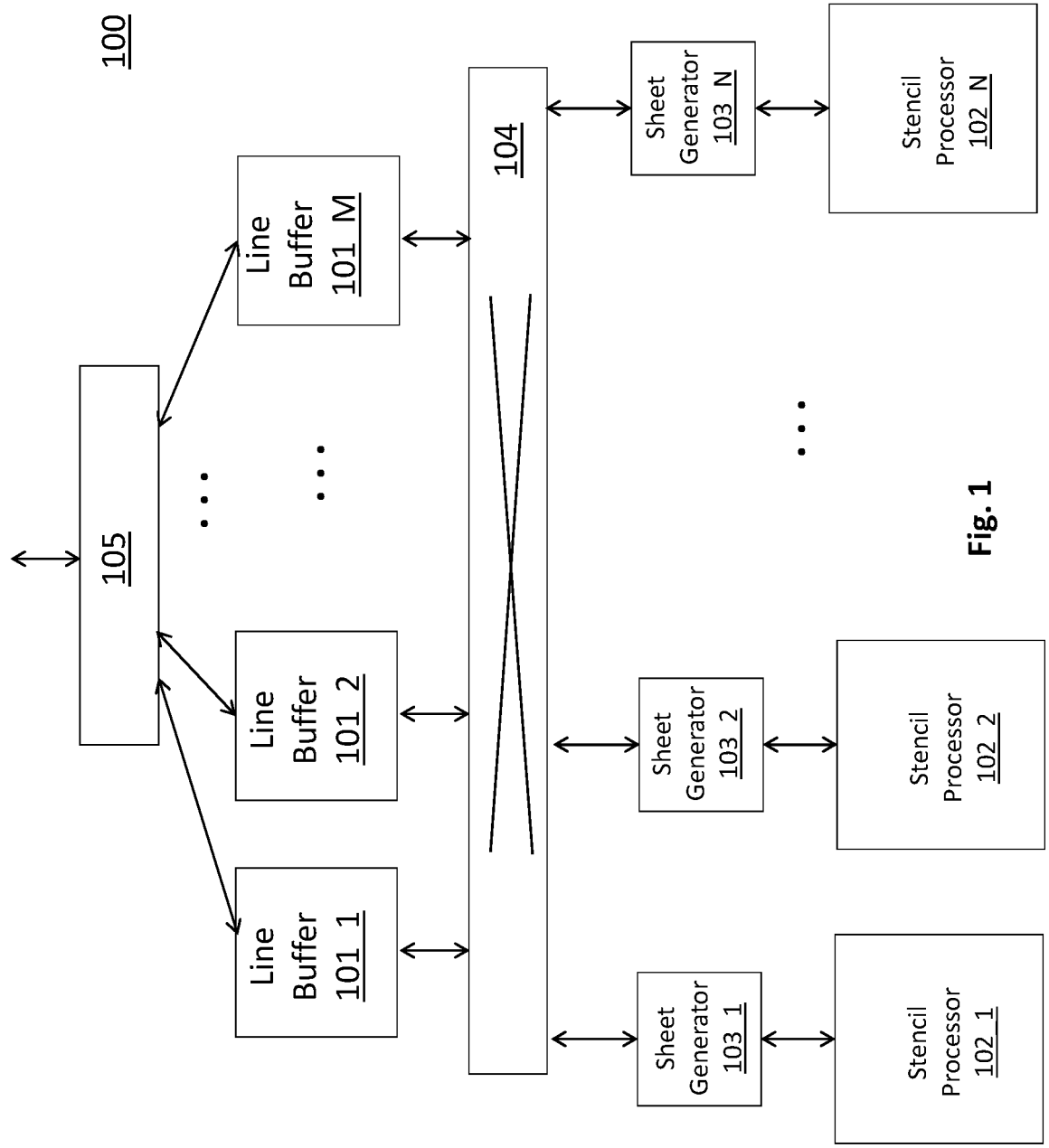
FIG. 1 shows an embodiment of an image processor hardware architecture.

1.0 Hardware Architecture Embodiments a. Image Processor Hardware Architecture and Operation FIG. 1 shows an embodiment of an architecture 100 for an image processor implemented in hardware. The image processor may be targeted, for example, by a compiler that converts program code written for a virtual processor within a simulated environment into program code that is actually executed by the hardware processor. As observed in FIG. 1, the architecture 100 includes a plurality of line buffer units 101_1 through 101_M (hereinafter "line buffers", "line buffer units" or the like) interconnected to a plurality of stencil processor units 102_1 through 102_N (hereinafter, "stencil processors", "stencil processor units", "image processing cores", "cores" and the like) and corresponding sheet generator units 103_1 through 103_N (hereinafter "sheet generators", "sheet generator units" or the like) through a network 104 (e.g., a network on chip (NOC) including an on chip switch network, an on chip ring network or other kind of network). In an embodiment, any line buffer unit may connect to any sheet generator and corresponding stencil processor through the network 104.

In an embodiment, program code is compiled and loaded onto a corresponding stencil processor 102 to perform the image processing operations earlier defined by a software developer (program code may also be loaded onto the stencil processor's associated sheet generator 103, e.g., depending on design and implementation). In at least some instances an image processing pipeline may be realized by loading a first kernel program for a first pipeline stage into a first stencil processor 102_1, loading a second kernel program for a second pipeline stage into a second stencil processor 102_2, etc. where the first kernel performs the functions of the first stage of the pipeline, the second kernel performs the functions of the second stage of the pipeline, etc. and additional control flow methods are installed to pass output image data from one stage of the pipeline to the next stage of the pipeline.

In other configurations, the image processor may be realized as a parallel machine having two or more stencil processors 102_1, 102_2 operating the same kernel program code. For example, a highly dense and high data rate stream of image data may be processed by spreading frames across multiple stencil processors each of which perform the same function.

In yet other configurations, essentially any DAG of kernels may be loaded onto the hardware processor by configuring respective stencil processors with their own respective kernel of program code and configuring appropriate control flow hooks into the hardware to direct output images from one kernel to the input of a next kernel in the DAG design.

As a general flow, frames of image data are received by a macro I/O unit 105 and passed to one or more of the line buffer units 101 on a frame-by-frame basis. A particular line buffer unit parses its frame of image data into a smaller region of image data, referred to as a "line group", and then passes the line group through the network 104 to a particular sheet generator. A complete or "full" singular line group may be composed, for example, with the data of multiple contiguous complete rows or columns of a frame (for brevity the present specification will mainly refer to contiguous rows). The sheet generator further parses the line group of image data into a smaller region of image data, referred to as a "sheet", and presents the sheet to its corresponding stencil processor.

In the case of an image processing pipeline or a DAG flow having a single input, generally, input frames are directed to the same line buffer unit 101_1 which parses the image data into line groups and directs the line groups to the sheet generator 103_1 whose corresponding stencil processor 102_1 is executing the code of the first kernel in the pipeline/DAG. Upon completion of operations by the stencil processor 102_1 on the line groups it processes, the sheet generator 103_1 sends output line groups to a "downstream" line buffer unit 101_2 (in some use cases the output line group may be sent back to the same line buffer unit 101_1 that earlier had sent the input line groups).

One or more "consumer" kernels that represent the next stage/operation in the pipeline/DAG executing on their own respective other sheet generator and stencil processor (e.g., sheet generator 103_2 and stencil processor 102_2) then receive from the downstream line buffer unit 101_2 the image data generated by the first stencil processor 102_1. In this manner, a "producer" kernel operating on a first stencil processor has its output data forwarded to a "consumer" kernel operating on a second stencil processor where the consumer kernel performs the next set of tasks after the producer kernel consistent with the design of the overall pipeline or DAG. Here, the line buffer unit 101_2 stores and forwards the image data generated by the producer kernel as part of the image data's transfer from the producer kernel to the consumer kernel.

A stencil processor 102 is designed to simultaneously operate on multiple overlapping stencils of image data. The multiple overlapping stencils and internal hardware processing capacity of the stencil processor effectively determines the size of a sheet. Here, within a stencil processor 102, arrays of execution lanes operate in unison to simultaneously process the image data surface area covered by the multiple overlapping stencils.

As will be described in more detail below, in various embodiments, sheets of image data are loaded into a two-dimensional register array structure within the stencil processor 102. The use of sheets and the two-dimensional register array structure is believed to effectively provide for power consumption improvements by moving a large amount of data into a large amount of register space as, e.g., a single load operation with processing tasks performed directly on the data immediately thereafter by an execution lane array. Additionally, the use of an execution lane array and corresponding register array provide for different stencil sizes that are easily programmable/configurable.

FIGS. 2a through 2e illustrate at a high level embodiments of both the parsing activity of a line buffer unit 101, the finer grained parsing activity of a sheet generator unit 103, as well as the stencil processing activity of the stencil processor 102 that is coupled to the sheet generator unit 103.

Figure 2A:
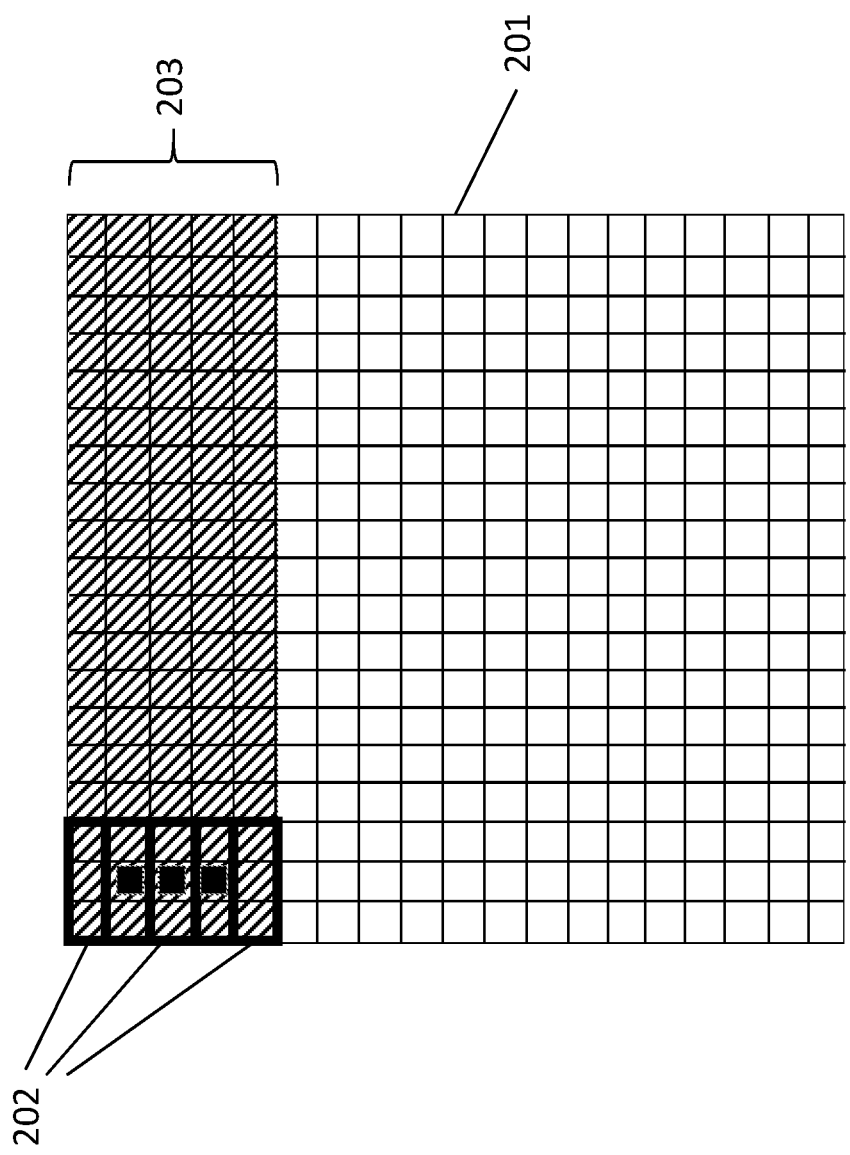
Figure 2C:
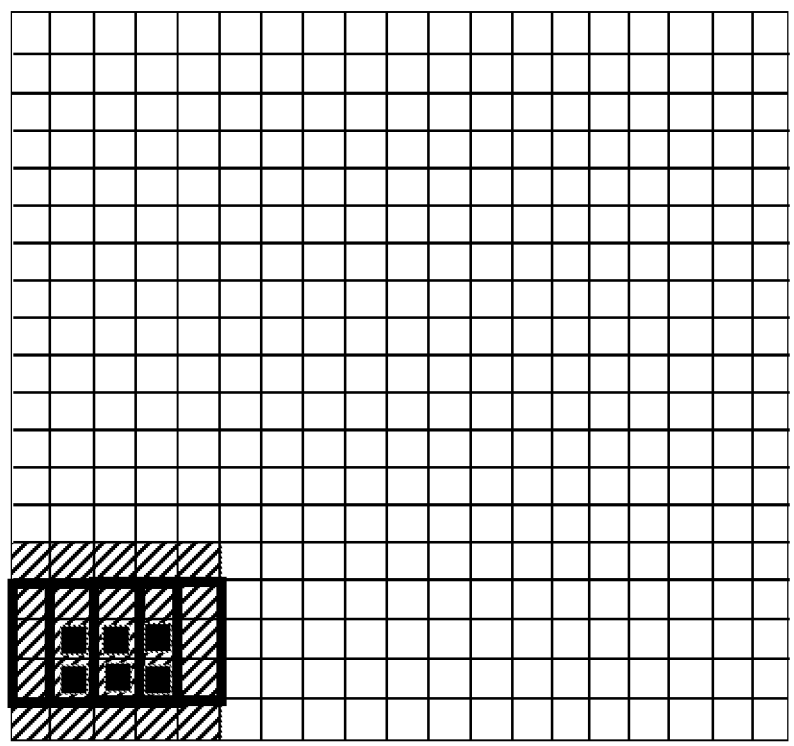
Figure 2D:
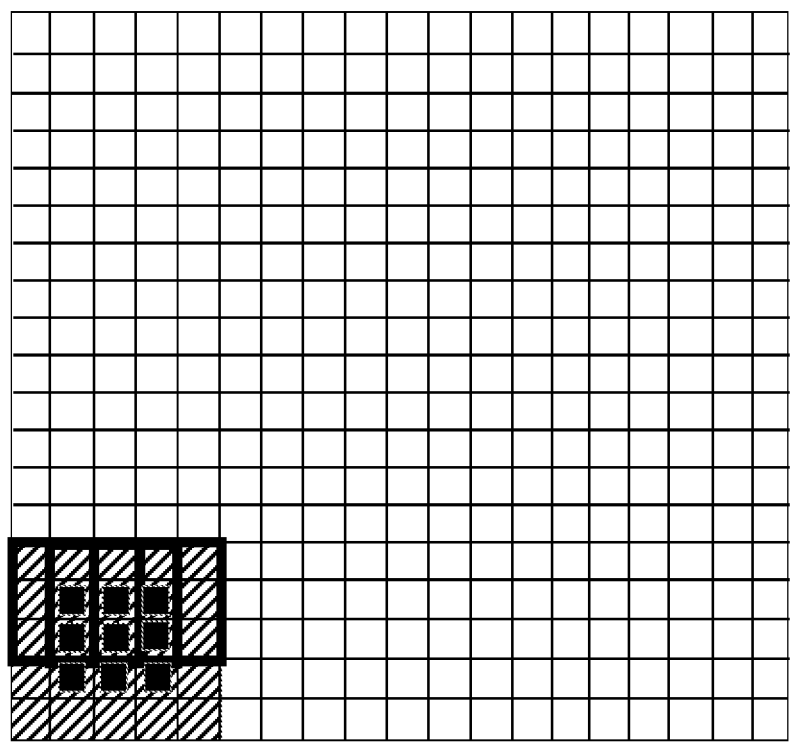

FIG. 2a depicts an embodiment of an input frame of image data 201. FIG. 2a also depicts an outline of three overlapping stencils 202 (each stencil having a dimension of 3 pixels by 3 pixels) that a stencil processor is designed to operate over. The output pixel that each stencil respectively generates output image data for is highlighted in solid black. For brevity, the three overlapping stencils 202 are depicted as overlapping only in the vertical direction. It is pertinent to recognize that in actuality a stencil processor may be designed to have overlapping stencils in both the vertical and horizontal directions.

Because of the vertical overlapping stencils 202 within the stencil processor, as observed in FIG. 2a, there exists a wide band of image data within the frame that a single stencil processor can operate over. As will be discussed in more detail below, in an embodiment, the stencil processors process data within their overlapping stencils in a left to right fashion across the image data (and then repeat for the next set of lines, in top to bottom order). Thus, as the stencil processors continue forward with their operation, the number of solid black output pixel blocks will grow right-wise horizontally. As discussed above, a line buffer unit 101 is responsible for parsing a line group of input image data from an incoming frame that is sufficient for the stencil processors to operate over for an extended number of upcoming cycles. An exemplary depiction of a line group is illustrated as a shaded region 203. In an embodiment, as described further below, the line buffer unit 101 can comprehend different dynamics for sending/receiving a line group to/from a sheet generator. For example, according to one mode, referred to as "full group", the complete full width lines of image data are passed between a line buffer unit and a sheet generator. According to a second mode, referred to as "virtually tall", a line group is passed initially with a subset of full width rows. The remaining rows are then passed sequentially in smaller (less than full width) pieces.

With the line group 203 of the input image data having been defined by the line buffer unit and passed to the sheet generator unit, the sheet generator unit further parses the line group into finer sheets that are more precisely fitted to the hardware limitations of the stencil processor. More specifically, as will be described in more detail further below, in an embodiment, each stencil processor consists of a two dimensional shift register array. The two dimensional shift register array essentially shifts image data "beneath" an array of execution lanes where the pattern of the shifting causes each execution lane to operate on data within its own respective stencil (that is, each execution lane processes on its own stencil of information to generate an output for that stencil). In an embodiment, sheets are surface areas of input image data that "fill" or are otherwise loaded into the two dimensional shift register array.

Thus, as observed in FIG. 2b, the sheet generator parses an initial sheet 204 from the line group 203 and provides it to the stencil processor (here, the exemplary sheet of data corresponds to the five by five shaded region that is generally identified by reference number 204). As observed in FIGS. 2c and 2d, the stencil processor operates on the sheet of input image data by effectively moving the overlapping stencils 202 in a left to right fashion over the sheet. As of FIG. 2d, the number of pixels for which an output value could be calculated (nine in a darkened 3 by 3 array) from the data within the sheet is exhausted (no other pixel positions can have an output value determined from the information within the sheet). For simplicity the border regions of the image have been ignored.

As observed in FIG. 2e the sheet generator then provides a next sheet 205 for the stencil processor to continue operations on. Note that the initial positions of the stencils as they begin operation on the next sheet is the next progression to the right from the point of exhaustion on the first sheet (as depicted previously in FIG. 2d). With the new sheet 205, the stencils will simply continue moving to the right as the stencil processor operates on the new sheet in the same manner as with the processing of the first sheet.

Note that there is some overlap between the data of the first sheet 204 and the data of the second sheet 205 owing to the border regions of stencils that surround an output pixel location. The overlap could be handled simply by the sheet generator re-transmitting the overlapping data twice. In alternate implementations, to feed a next sheet to the stencil processor, the sheet generator may proceed to only send new data to the stencil processor and the stencil processor reuses the overlapping data from the previous sheet.

b. Stencil Processor Design and Operation

Figure 3A:
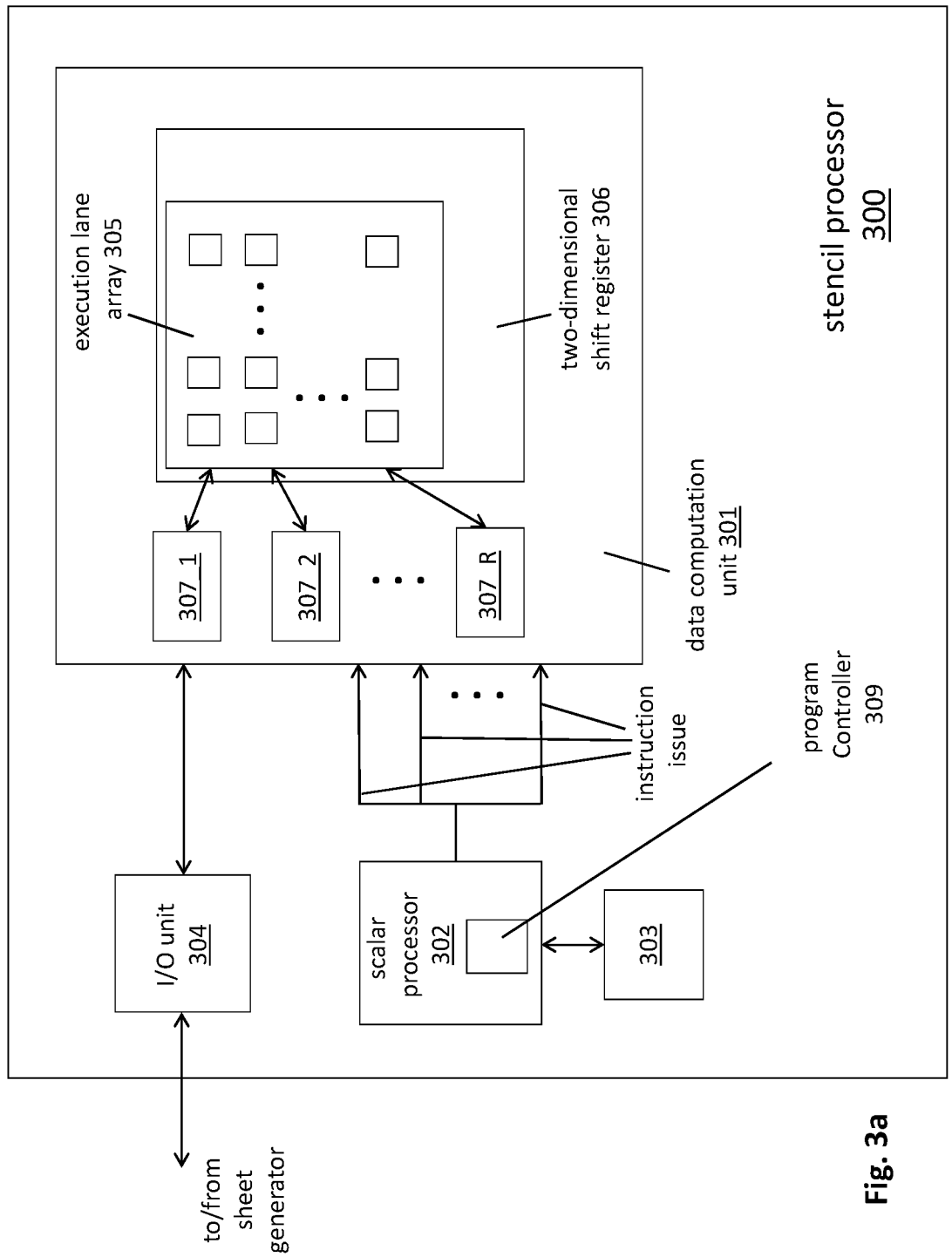
FIG. 3a shows an embodiment of a stencil processor.

FIG. 3a shows an embodiment of a stencil processor unit architecture 300. As observed in FIG. 3a, the stencil processor includes a data computation unit 301, a scalar processor 302 and associated memory 303 and an I/O unit 304. The data computation unit 301 includes an array of execution lanes 305, a two-dimensional shift array structure 306 and separate respective random access memories 307 associated with specific rows or columns of the array.

The I/O unit 304 is responsible for loading "input" sheets of data received from the sheet generator into the data computation unit 301 and storing "output" sheets of data from the stencil processor into the sheet generator. In an embodiment the loading of sheet data into the data computation unit 301 entails parsing a received sheet into rows/columns of image data and loading the rows/columns of image data into the two dimensional shift register structure 306 or respective random access memories 307 of the rows/columns of the execution lane array (described in more detail below). If the sheet is initially loaded into memories 307, the individual execution lanes within the execution lane array 305 may then load sheet data into the two-dimensional shift register structure 306 from the random access memories 307 when appropriate (e.g., as a load instruction just prior to operation on the sheet's data). Upon completion of the loading of a sheet of data into the register structure 306 (whether directly from a sheet generator or from memories 307), the execution lanes of the execution lane array 305 operate on the data and eventually "write back" finished data as a sheet directly back to the sheet generator, or, into the random access memories 307. If the execution lanes write back to random access memories 307, the I/O unit 304 fetches the data from the random access memories 307 to form an output sheet which is then forwarded to the sheet generator.

The scalar processor 302 includes a program controller 309 that reads the instructions of the stencil processor's program code from scalar memory 303 and issues the instructions to the execution lanes in the execution lane array 305. In an embodiment, a single same instruction is broadcast to all execution lanes within the array 305 to effect single instruction multiple data (SIMD)-like behavior from the data computation unit 301. In an embodiment, the instruction format of the instructions read from scalar memory 303 and issued to the execution lanes of the execution lane array 305 includes a very-long-instruction-word (VLIW) type format that includes more than one opcode per instruction. In a further embodiment, the VLIW format includes both an ALU opcode that directs a mathematical function performed by each execution lane's ALU (which, as described below, in an embodiment may specify more than one traditional ALU operation) and a memory opcode (that directs a memory operation for a specific execution lane or set of execution lanes).

The term "execution lane" refers to a set of one or more execution units capable of executing an instruction (e.g., logic circuitry that can execute an instruction). An execution lane can, in various embodiments, include more processor-like functionality beyond just execution units, however. For example, besides one or more execution units, an execution lane may also include logic circuitry that decodes a received instruction, or, in the case of more multiple instruction multiple data (MIMD)-like designs, logic circuitry that fetches and decodes an instruction. With respect to MIMD-like approaches, although a centralized program control approach has largely been described herein, a more distributed approach may be implemented in various alternative embodiments (e.g., including program code and a program controller within each execution lane of the array 305).

The combination of an execution lane array 305, program controller 309 and two dimensional shift register structure 306 provides a widely adaptable/configurable hardware platform for a broad range of programmable functions. For example, application software developers are able to program kernels having a wide range of different functional capability as well as dimension (e.g., stencil size) given that the individual execution lanes are able to perform a wide variety of functions and are able to readily access input image data proximate to any output array location.

Apart from acting as a data store for image data being operated on by the execution lane array 305, the random access memories 307 may also keep one or more look-up tables. In various embodiments one or more scalar look-up tables may also be instantiated within the scalar memory 303. Look-up tables are often used by image processing tasks to, e.g., obtain filter or transform coefficients for different array locations, implement complex functions (e.g., gamma curves, sine, cosine) where the look-up table provides the function output for an input index value, etc. Here, it is expected that SIMD image processing sequences will often perform a look-up into a same look-up table during a same clock cycle. Similarly, one or more constant tables may be stored in the scalar memory 303. Here, e.g., it is expected that the different execution lanes may need a same constant or other value on the same clock cycle (e.g., a particular multiplier to be applied against an entire image). Thus, accesses into a constant look-up table return a same, scalar value to each of the execution lanes. Look-up tables are typically accessed with an index value.

A scalar look-up involves passing the same data value from the same look-up table from the same index to each of the execution lanes within the execution lane array 305. In various embodiments, the VLIW instruction format described above is expanded to also include a scalar opcode that directs a look-up operation performed by the scalar processor into a scalar look-up table. The index that is specified for use with the opcode may be an immediate operand or fetched from some other data storage location. Regardless, in an embodiment, a look up from a scalar look-up table within scalar memory essentially involves broadcasting the same data value to all execution lanes within the execution lane array 305 during the same clock cycle. Additional details concerning the use and operation of look-up tables is provided further below.

FIG. 3b summarizes the VLIW instruction word embodiments(s) discussed above. As observed in FIG. 3b, the VLIW instruction word format includes fields for three separate instructions: 1) a scalar instruction 351 that is executed by the scalar processor; 2) an ALU instruction 352 that is broadcasted and executed in SIMD fashion by the respective ALUs within the execution lane array; and, 3) a memory instruction 353 that is broadcasted and executed in a partial SIMD fashion (e.g., if execution lanes along a same row in the execution lane array share a same random access memory, then one execution lane from each of the different rows actually execute the instruction (the format of the memory instruction 353 may include an operand that identifies which execution lane from each row executes the instruction)).

A field 354 for one or more immediate operands is also included. Which of the instructions 351, 352, 353 use which immediate operand information may be identified in the instruction format. Each of instructions 351, 352, 353 also includes its own respective input operand and resultant information (e.g., local registers for ALU operations and a local register and a memory address for memory access instructions). In an embodiment, the scalar instruction 351 is executed by the scalar processor before the execution lanes within the execution lane array execute either of the other two instructions 352, 353. That is, the execution of the VLIW word includes a first cycle upon which the scalar instruction 351 is executed followed by a second cycle upon with the other instructions 352, 353 may be executed (note that in various embodiments instructions 352 and 353 may be executed in parallel).

In an embodiment, the scalar instructions executed by the scalar processor 302 include commands issued to the sheet generator 103 to load/store sheets from/into the memories or 2D shift register 306 of the data computation unit 301. Here, the sheet generator's operation can be dependent on the operation of the line buffer unit 101 or other variables that prevent pre-runtime comprehension of the number of cycles it will take the sheet generator 103 to complete any command issued by the scalar processor 302. As such, in an embodiment, any VLIW word whose scalar instruction 351 corresponds to or otherwise causes a command to be issued to the sheet generator 103 also includes no-operation (NOOP) instructions in the other two instruction fields 352, 353. The program code then enters a loop of NOOP instructions for instruction fields 352, 353 until the sheet generator completes its load/store to/from the data computation unit. Here, upon issuing a command to the sheet generator, the scalar processor may set a bit of an interlock register that the sheet generator resets upon completion of the command. During the NOOP loop the scalar processor monitors the bit of the interlock bit. When the scalar processor detects that the sheet generator has completed its command normal execution begins again.

Figure 4:
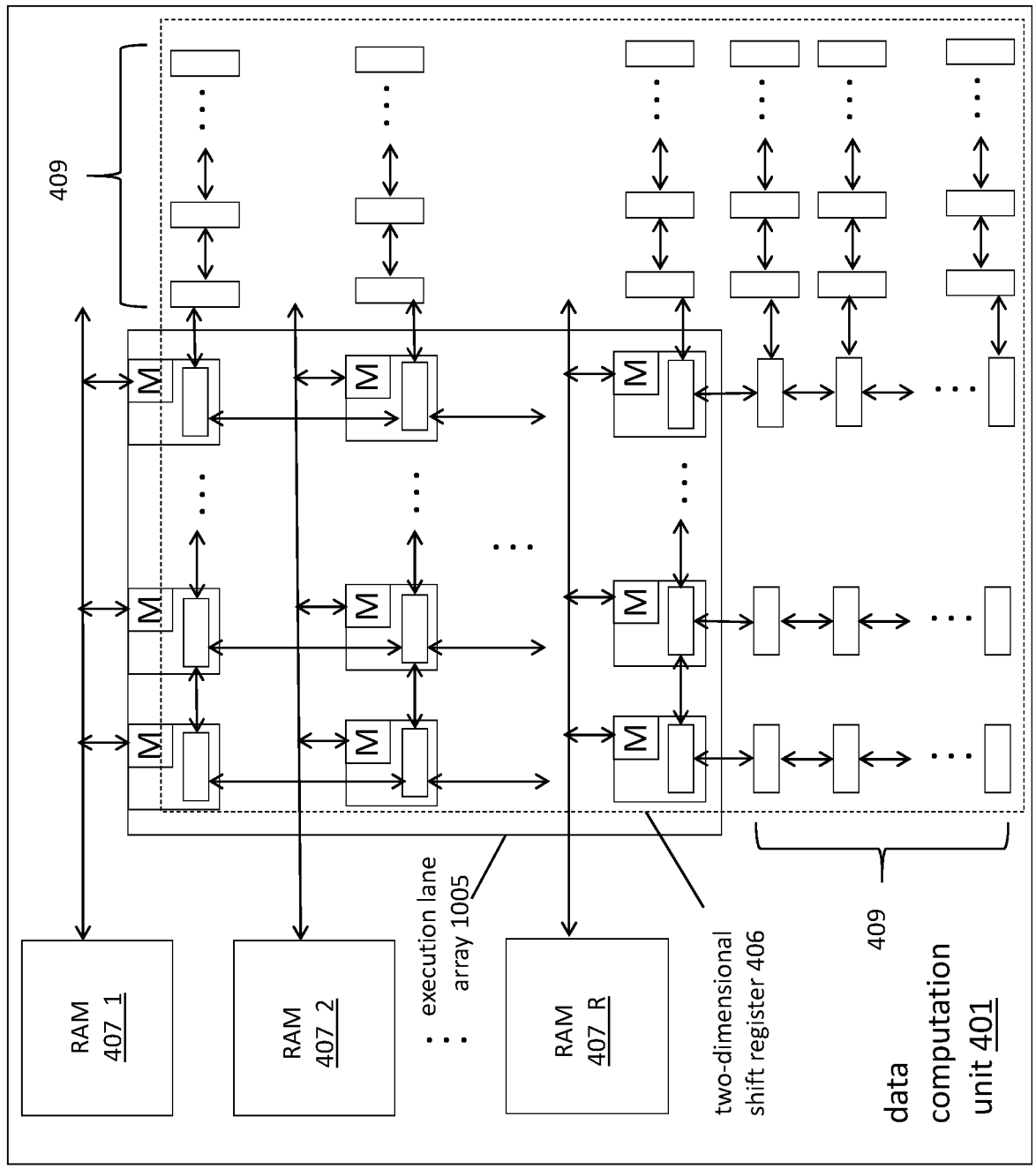
FIG. 4 shows an embodiment of a data computation unit within a stencil processor.

FIG. 4 shows an embodiment of a data computation unit 401. As observed in FIG. 4, the data computation unit 401 includes an array of execution lanes 405 that are logically positioned "above" a two-dimensional shift register array structure 406. As discussed above, in various embodiments, a sheet of image data provided by a sheet generator is loaded into the two-dimensional shift register 406. The execution lanes then operate on the sheet data from the register structure 406.

The execution lane array 405 and shift register structure 406 are fixed in position relative to one another. However, the data within the shift register array 406 shifts in a strategic and coordinated fashion to cause each execution lane in the execution lane array to process a different stencil within the data. As such, each execution lane determines the output image value for a different pixel in the output sheet being generated. From the architecture of FIG. 4 it should be clear that overlapping stencils are not only arranged vertically but also horizontally as the execution lane array 405 includes vertically adjacent execution lanes as well as horizontally adjacent execution lanes.

Some notable architectural features of the data computation unit 401 include the shift register structure 406 having wider dimensions than the execution lane array 405. That is, there is a "halo" of registers 409 outside the execution lane array 405. Although the halo 409 is shown to exist on two sides of the execution lane array, depending on implementation, the halo may exist on less (one) or more (three or four) sides of the execution lane array 405. The halo 405 serves to provide "spill-over" space for data that spills outside the bounds of the execution lane array 405 as the data is shifting "beneath" the execution lanes 405. As a simple case, a 5×5 stencil centered on the right edge of the execution lane array 405 will need four halo register locations further to the right when the stencil's leftmost pixels are processed. For ease of drawing, FIG. 4 shows the registers of the right side of the halo as only having horizontal shift connections and registers of the bottom side of the halo as only having vertical shift connections when, in a nominal embodiment, registers on either side (right, bottom) would have both horizontal and vertical connections.

Additional spill-over room is provided by random access memories 407 that are coupled to each row and/or each column in the array, or portions thereof (e.g., a random access memory may be assigned to a "region" of the execution lane array that spans 4 execution lanes row wise and 2 execution lanes column wise. For simplicity the remainder of the application will refer mainly to row and/or column based allocation schemes). Here, if an execution lane's kernel operations require it to process pixel values outside of the two-dimensional shift register array 406 (which some image processing routines may require) the plane of image data is able to further spill-over, e.g., from the halo region 409 into random access memory 407. For example, consider a 6×6 stencil where the hardware includes a halo region of only four storage elements to the right of an execution lane on the right edge of the execution lane array. In this case, the data would need to be shifted further to the right off the right edge of the halo 409 to fully process the stencil. Data that is shifted outside the halo region 409 would then spill over to random access memory 407. Other applications of the random access memories 407 and the stencil processor of FIG. 3 are provided further below.

FIGS. 5a through 5k demonstrate a working example of the manner in which image data is shifted within the two-dimensional shift register array "beneath" the execution lane array as alluded to above. As observed in FIG. 5a, the data contents of the two-dimensional shift array are depicted in a first array 507 and the execution lane array is depicted by a frame 505. Also, two neighboring execution lanes 510 within the execution lane array are simplistically depicted. In this simplistic depiction 510, each execution lane includes a register R1 that can accept data from the shift register, accept data from an ALU output (e.g., to behave as an accumulator across cycles), or write output data into an output destination.

Each execution lane also has available, in a local register R2, the contents "beneath" it in the two-dimensional shift array. Thus, R1 is a physical register of the execution lane while R2 is a physical register of the two-dimensional shift register array. The execution lane includes an ALU that can operate on operands provided by R1 and/or R2. As will be described in more detail further below, in an embodiment the shift register is actually implemented with multiple (a "depth" of) storage/register elements per array location but the shifting activity is limited to one plane of storage elements (e.g., only one plane of storage elements can shift per cycle). FIGS. 5a through 5k depict one of these deeper register locations as being used to store the resultant X from the respective execution lanes. For illustrative ease the deeper resultant register is drawn alongside rather than beneath its counterpart register R2.

FIGS. 5a through 5k focus on the calculation of two stencils whose central position is aligned with the pair of execution lane positions 511 depicted within the execution lane array 505. For ease of illustration, the pair of execution lanes 510 are drawn as horizontal neighbors when in fact, according to the following example, they are vertical neighbors.

Figure 5B:
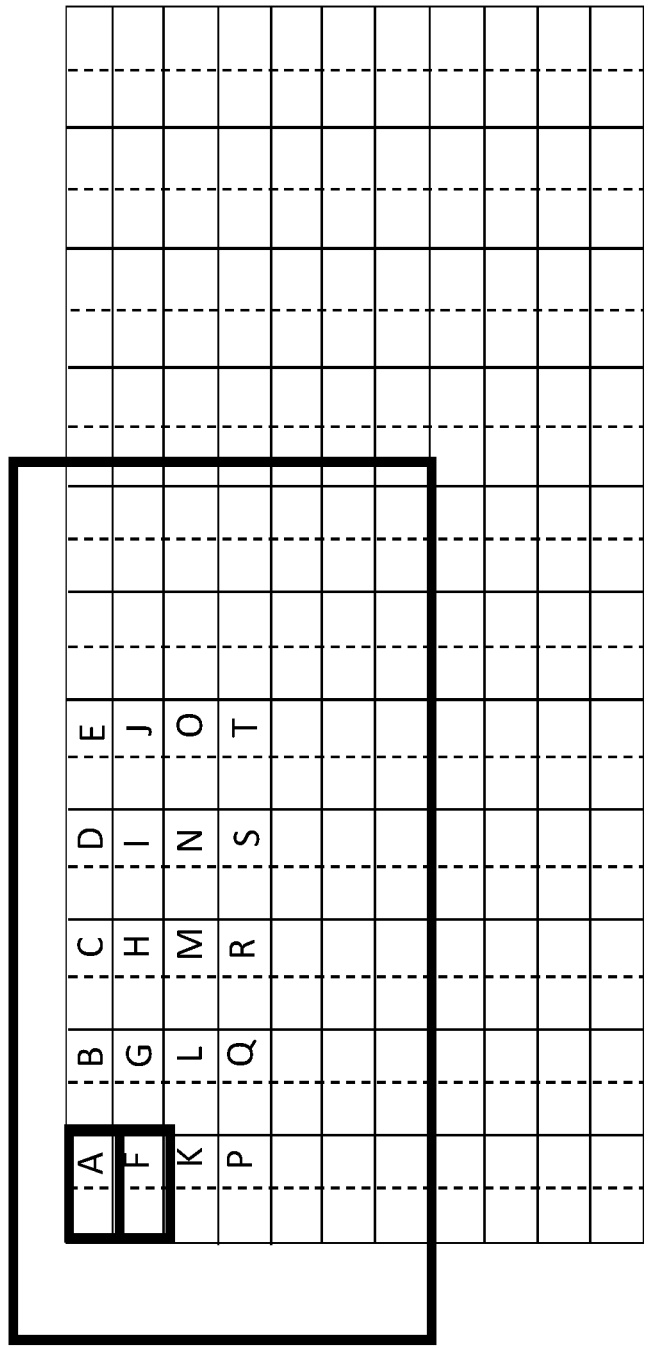

As observed initially in FIG. 5a, the execution lanes 511 are centered on their central stencil locations. FIG. 5b shows the object code executed by both execution lanes 511. As observed in FIG. 11b the program code of both execution lanes 511 causes the data within the shift register array 507 to shift down one position and shift right one position. This aligns both execution lanes 511 to the upper left hand corner of their respective stencils. The program code then causes the data that is located (in R2) in their respective locations to be loaded into R1.

Figure 5C:
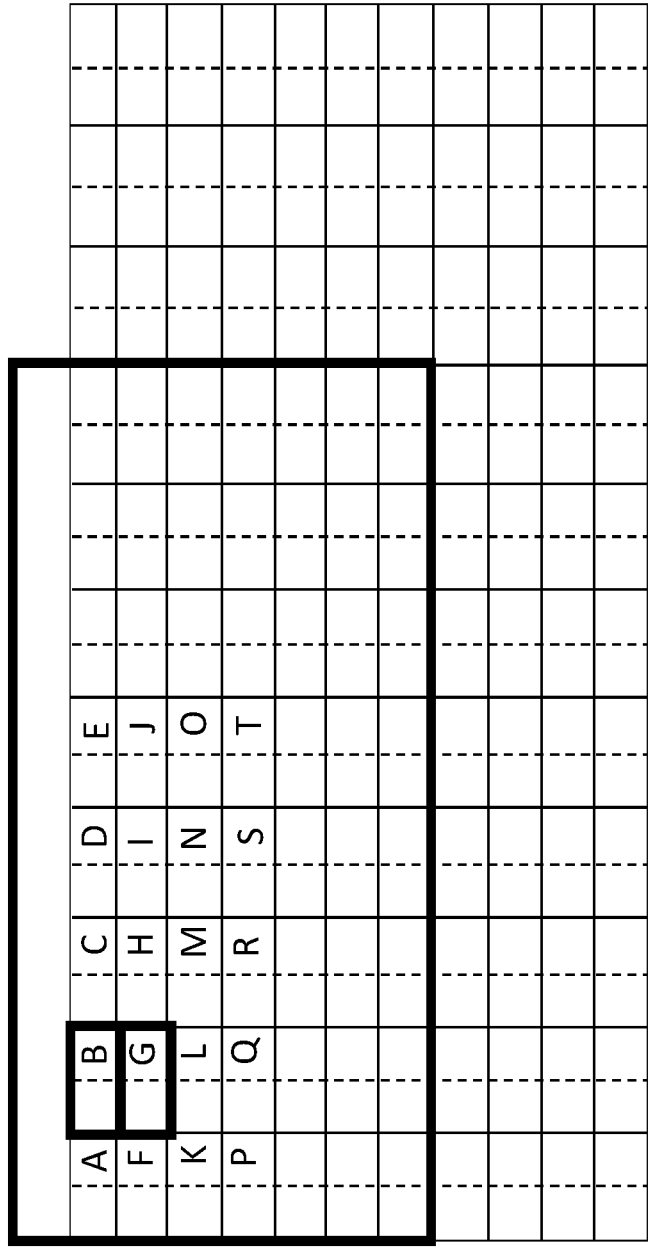
Figure 5D:
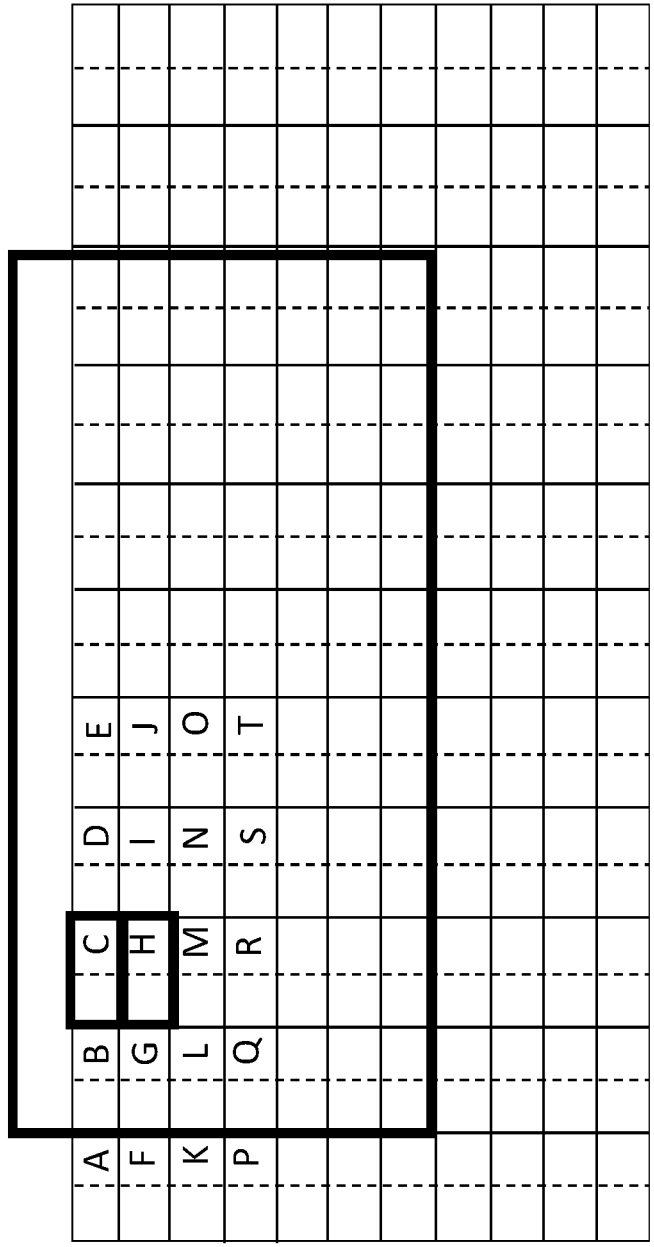

As observed in FIG. 5c the program code next causes the pair of execution lanes 511 to shift the data within the shift register array 507 one unit to the left which causes the value to the right of each execution lane's respective position to be shifted into each execution lane' position. The value in R1 (previous value) is then added with the new value that has shifted into the execution lane's position (in R2). The resultant is written into R1. As observed in FIG. 5d the same process as described above for FIG. 5c is repeated which causes the resultant R1 to now include the value A+B+C in the upper execution lane and F+G+H in the lower execution lane. At this point both execution lanes 511 have processed the upper row of their respective stencils. Note the spill-over into a halo region on the left side of the execution lane array 505 (if one exists on the left hand side) or into random access memory if a halo region does not exist on the left hand side of the execution lane array 505.

Figure 5E:
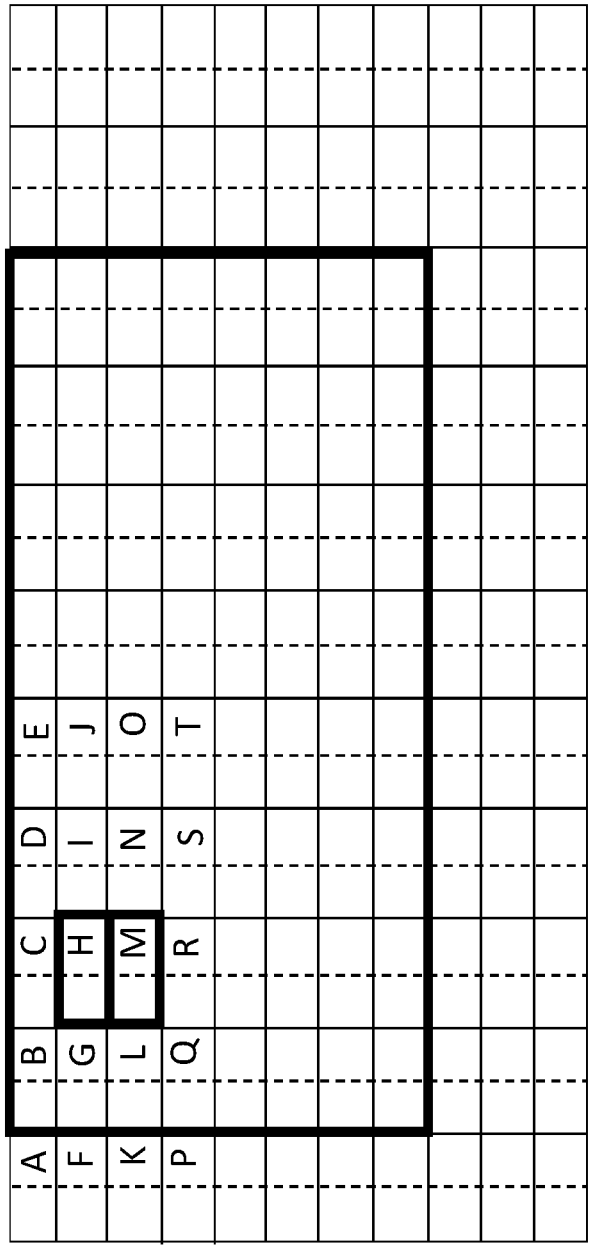
Figure 5F:
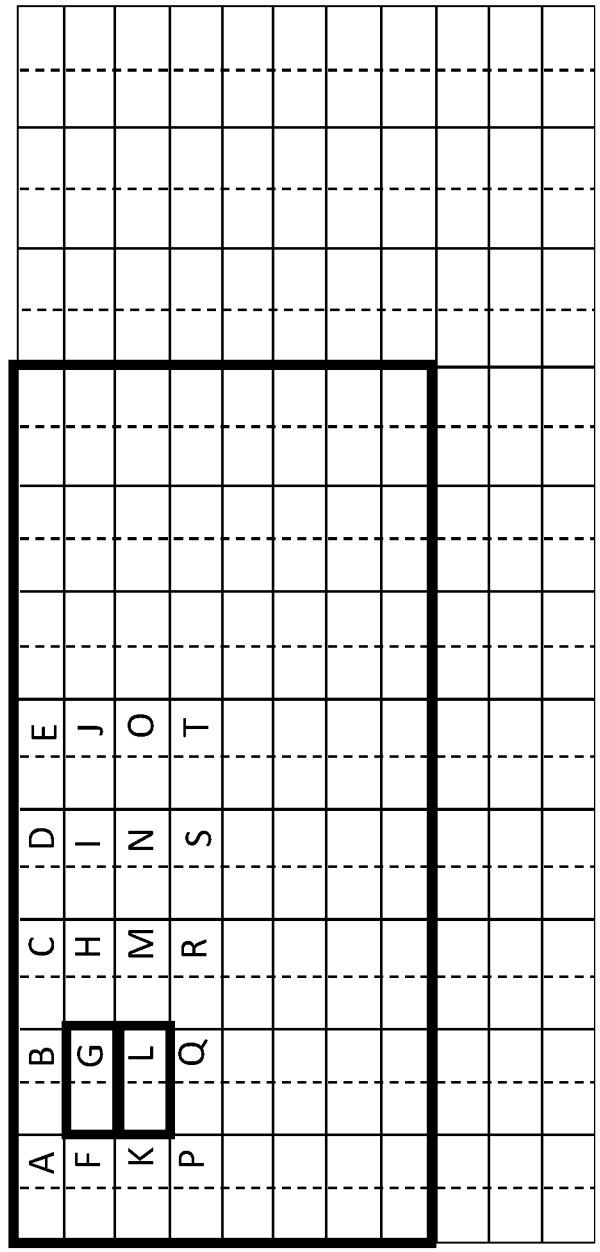
Figure 5G:
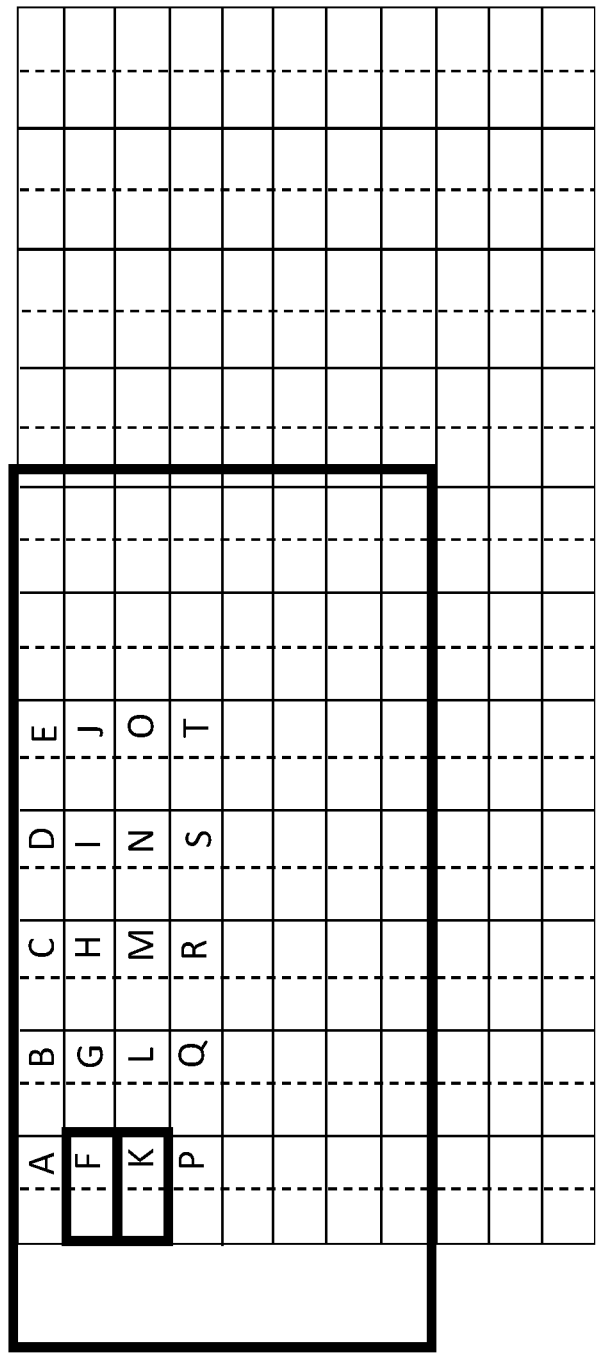

As observed in FIG. 5e, the program code next causes the data within the shift register array to shift one unit up which causes both execution lanes 511 to be aligned with the right edge of the middle row of their respective stencils. Register R1 of both execution lanes 511 currently includes the summation of the stencil's top row and the middle row's rightmost value. FIGS. 5f and 5g demonstrate continued progress moving leftwise across the middle row of both execution lane's stencils. The accumulative addition continues such that at the end of processing of FIG. 5g both execution lanes 511 include the summation of the values of the top row and the middle row of their respective stencils.

Figure 5H:
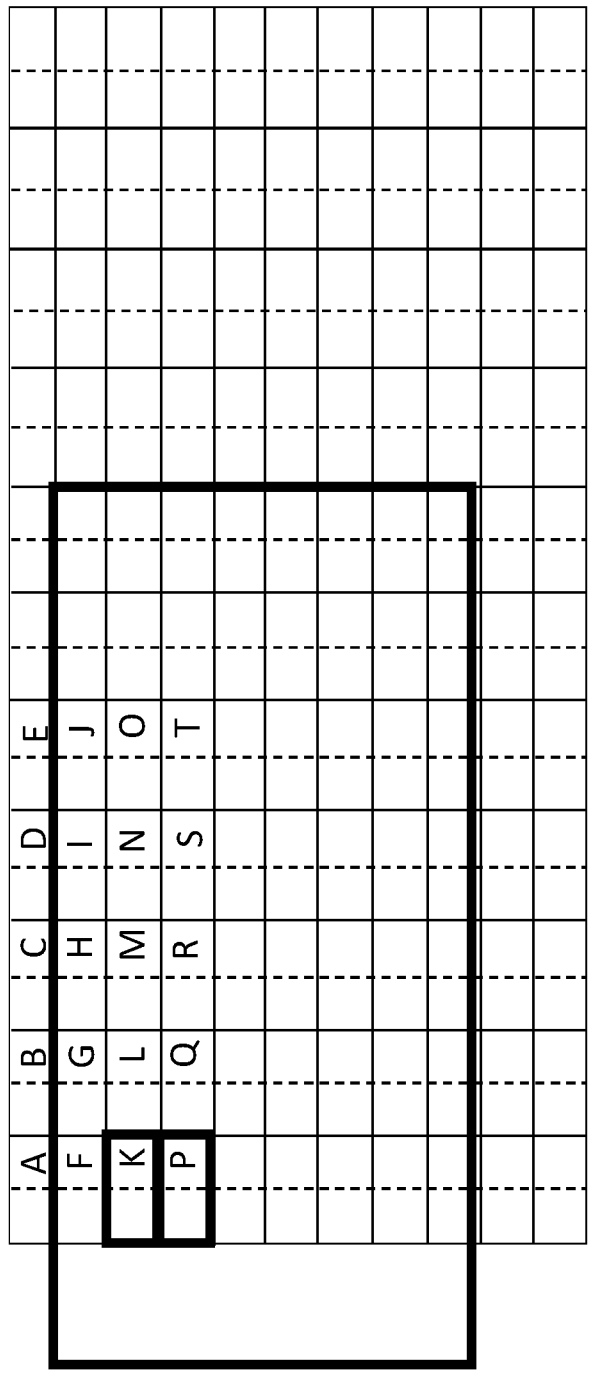
Figure 5I:
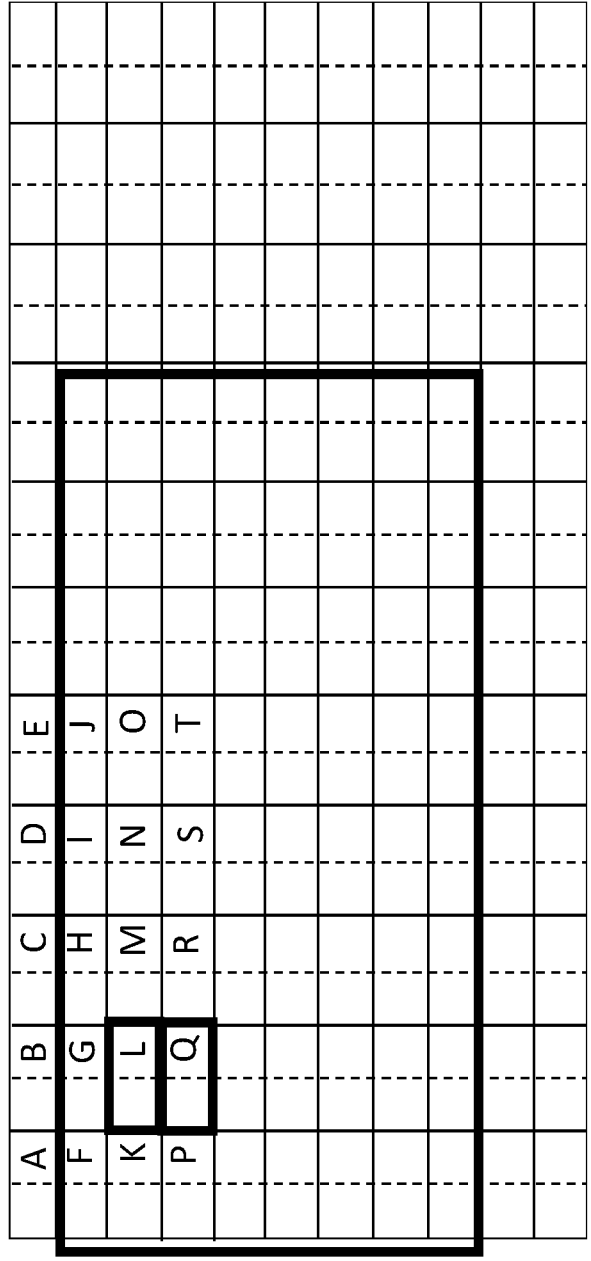
Figure 5J:
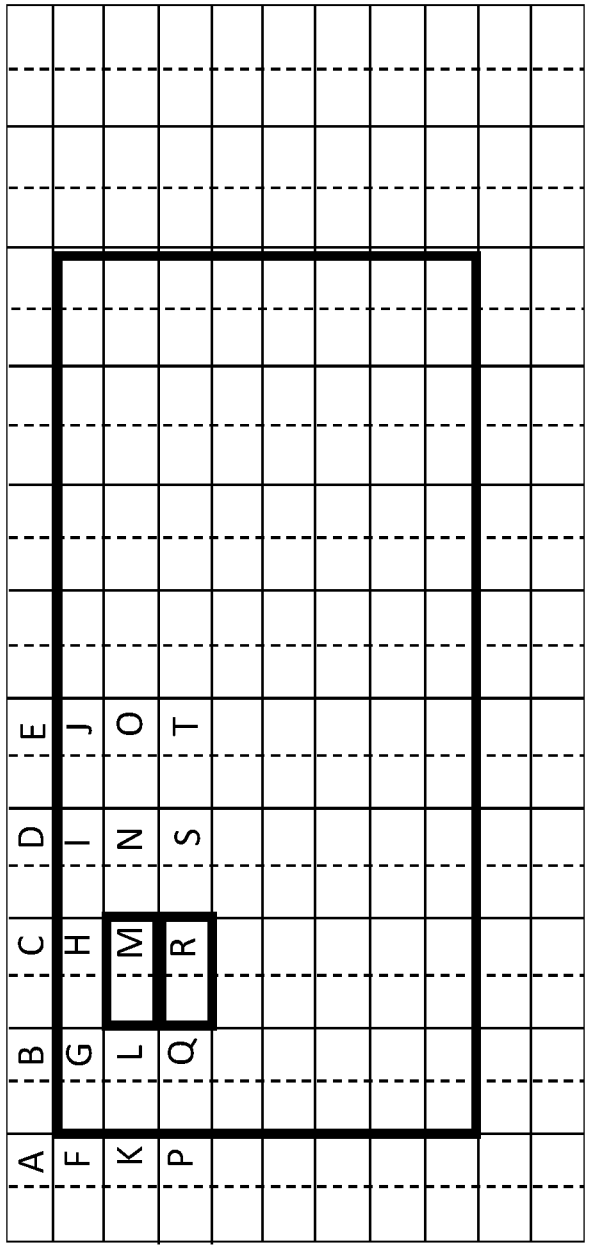
Figure 5K:
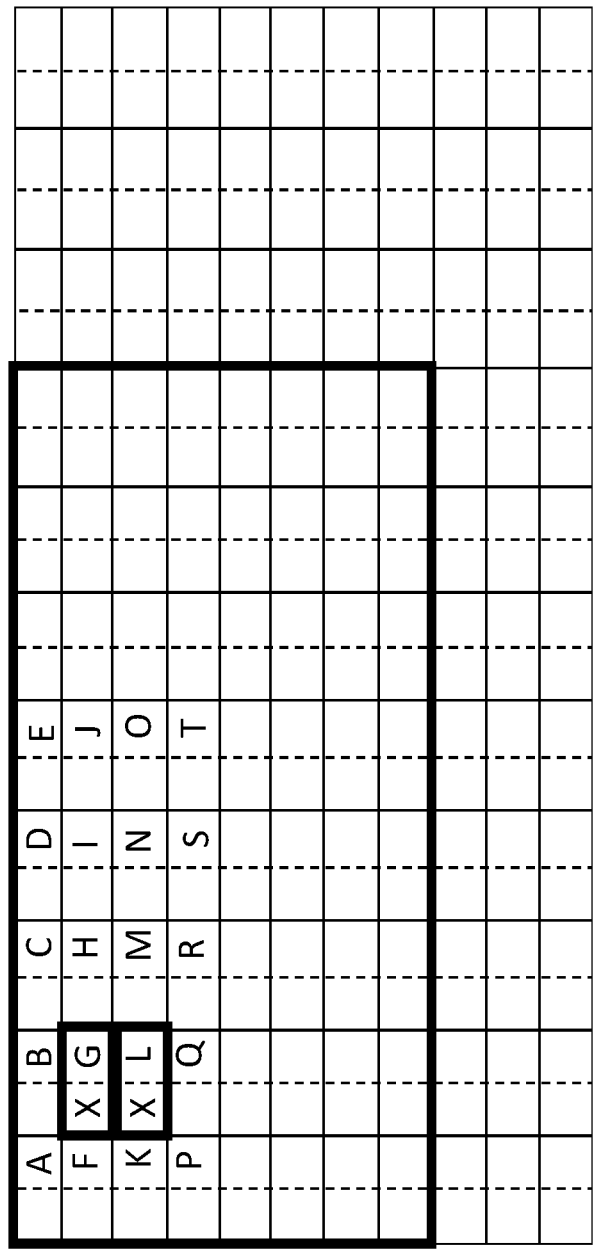

FIG. 5h shows another shift to align each execution lane with its corresponding stencil's lowest row. FIGS. 5i and 5j show continued shifting to complete processing over the course of both execution lanes' stencils. FIG. 5k shows additional shifting to align each execution lane with its correct position in the data array and write the resultant thereto.

In the example of FIGS. 5a-5k note that the object code for the shift operations may include an instruction format that identifies the direction and magnitude of the shift expressed in (X, Y) coordinates. For example, the object code for a shift up by one location may be expressed in object code as SHIFT 0, +1. As another example, a shift to the right by one location may be expressed in object code as SHIFT +1, 0. In various embodiments shifts of larger magnitude may also be specified in object code (e.g., SHIFT 0, +2). Here, if the 2D shift register hardware only supports shifts by one location per cycle, the instruction may be interpreted by the machine to require multiple cycle execution, or, the 2D shift register hardware may be designed to support shifts by more than one location per cycle. Embodiments of the later are described in more detail further below.

Figure 6:
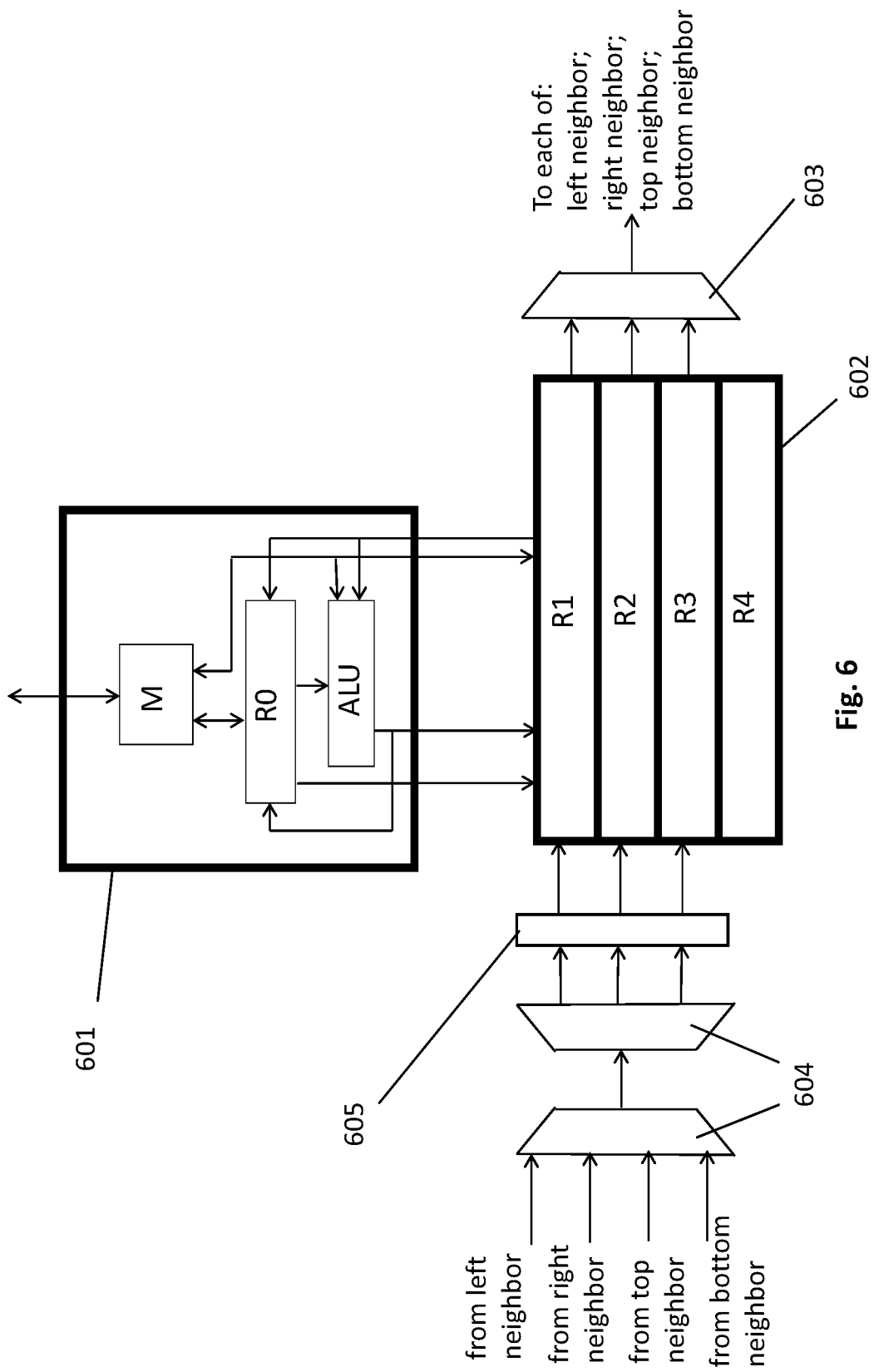
FIG. 6 shows an embodiment of a unit cell for an integrated execution lane array and two-dimensional shift array.

FIG. 6 shows another, more detailed depiction of the unit cell for the array execution lane and shift register structure (registers in the halo region do not include a corresponding execution lane). The execution lane and the register space that is associated with each location in the execution lane array is, in an embodiment, implemented by instantiating the circuitry observed in FIG. 6 at each node of the execution lane array. As observed in FIG. 6, the unit cell includes an execution lane 601 coupled to a register file 602 consisting of four registers R1 through R4. During any cycle, the execution lane 601 may read from or write to any of registers R0 through R4. For instructions requiring two input operands the execution lane may retrieve both of operands from any of R0 through R4.

In an embodiment, the two dimensional shift register structure is implemented by permitting, during a single cycle, the contents of any of (only) one of registers R1 through R3 to be shifted "out" to one of its neighbor's register files through output multiplexer 603, and, having the contents of any of (only) one of registers R1 through R3 replaced with content that is shifted "in" from a corresponding one if its neighbors through input multiplexers 604 such that shifts between neighbors are in a same direction (e.g., all execution lanes shift left, all execution lanes shift right, etc.). Although it may be common for a same register to have its contents shifted out and replaced with content that is shifted in on a same cycle, the multiplexer arrangement 603, 604 permits for different shift source and shift target registers within a same register file during a same cycle.

As depicted in FIG. 6 note that during a shift sequence an execution lane will shift content out from its register file 602 to each of its left, right, top, and bottom neighbors. In conjunction with the same shift sequence, the execution lane will also shift content into its register file from a particular one of its left, right, top, and bottom neighbors. Again, the shift out target and shift in source should be consistent with a same shift direction for all execution lanes (e.g., if the shift out is to the right neighbor, the shift in should be from the left neighbor).

Although in one embodiment the content of only one register is permitted to be shifted per execution lane per cycle, other embodiments may permit the content of more than one register to be shifted in/out. For example, the content of two registers may be shifted out/in during a same cycle if a second instance of the multiplexer circuitry 603, 604 observed in FIG. 6 is incorporated into the design of FIG. 6. Of course, in embodiments where the content of only one register is permitted to be shifted per cycle, shifts from multiple registers may take place between mathematical operations by consuming more clock cycles for shifts between mathematical operations (e.g., the contents of two registers may be shifted between math ops by consuming two shift ops between the math ops).

If less than all the content of an execution lane's register files are shifted out during a shift sequence note that the content of the non shifted out registers of each execution lane remain in place (do not shift). As such, any non-shifted content that is not replaced with shifted-in content persists local to the execution lane across the shifting cycle. The memory unit ("M") observed in each execution lane is used to load/store data from/to the random access memory space that is associated with the execution lane's row and/or column within the execution lane array. Here, the M unit acts as a standard M unit in that it is often used to load/store data that cannot be loaded/stored from/to the execution lane's own register space. In various embodiments, the primary operation of the M unit is to write data from a local register into memory, and, read data from memory and write it into a local register.

With respect to the instruction set architecture (ISA) opcodes supported by the ALU unit of the hardware execution lane 601, in various embodiments, the mathematical opcodes supported by the hardware ALU are integrally tied with (e.g., substantially the same as) the mathematical opcodes supported by a virtual execution lane (e.g., ADD, SUB, MOV, MUL, MAD, ABS, DIV, SHL, SHR, MIN/MAX, SEL, AND, OR, XOR, NOT). As described just above, memory access instructions can be executed by the execution lane 601 to fetch/store data from/to their associated random access memory. Additionally the hardware execution lane 601 supports shift operation instructions (right, left, up, down) to shift data within the two-dimensional shift register structure. As described above, program control instructions are largely executed by the scalar processor of the stencil processor.

2.0 Program Code Transformations to Improve Runtime Efficiency

As described at length above, application software being developed for the image processor may be defined by combining smaller, finer grained software programs, referred to herein as kernels, into a larger overall structure such as a directed acyclic graph. The definition generally includes coupling the different kernels into a specific data flow pattern in which a number of "producing" kernels source their output image data to one or more "consuming" kernels. At least one kernel receives the overall input image that the application software program operates on and, typically, one of the kernels generates the overall output image of the application software.

Each kernel is then mapped to a specific stencil processor. Each stencil processor has an associated sheet generator that receives the image data that its associated stencil processor's kernel is to operate on. In various embodiments, the image data is received by the sheet generator in groups of lines. For example, the sheet generator may receive the image data as a number of rows across the full width of an input image frame. The sheet generator then forms two dimensional "sheets" of image data that are provided to the stencil processor and eventually loaded into the stencil processor's two dimensional shift register array.

In various embodiments, the sheet generators are implemented with dedicated hardware logic circuitry (e.g., application specific integrated circuitry (ASIC) logic circuitry), programmable logic circuitry (e.g., field programmable gate array logic circuitry), embedded processor logic circuitry or any combination of these to implement the functionality of the sheet generator. Dedicated hardware logic circuitry (if any) have associated configuration registers that are set with information generated by the compilation process of the application software that cause the sheet generator to perform sheet generation activity for the kernel of the kernel that is mapped to the stencil processor that the sheet generator is associated with. Programmable logic circuitry (if any) is programmed with information generated by the compilation process of the application software that causes the programmable logic circuitry to implement sheet generator functionality for the kernel that is to execute on the stencil processor that has been mapped to the sheet generator's associated stencil processor. Embedded processor circuitry (if any) is provided with program code generated by the compilation process of the application software that when executed by the embedded processor causes the embedded processor to implement sheet generator functionality for the kernel that is to execute on the stencil processor that has been mapped to the sheet generator's associated stencil processor. The stencil processor's scalar processor may also be programmed to perform, assist or otherwise be involved with various sheet generation activity tasks. Same kinds of circuit implementation possibilities and associated compiled program code and/or information may also exist with respect to the line buffer units.

The application software development process therefore not only includes the mapping of a kernel to a specific stencil processor but also includes the generation of associated configuration information and/or program code that is used to perform the sheet generation activity for the kernel.

In various application software program development environments, a compiler that is responsible for accepting a higher level description of an application software program and, in response, generate lower level program code (e.g., object code) and any associated configuration information for execution by the image processor will recognize various inefficiencies in the application software and change the program code being compiled to improve upon or otherwise reduce the inefficiency. The program code being changed may be program code and/or configuration information for one or more sheet generators and/or the kernels that are to be fed by them and/or line buffer units.

FIG. 7a pertains to a first potential inefficiency. As observed in FIG. 7a, an input image 701 is received by a sheet generator, e.g., as a number of line groups sent by a line buffer unit. As observed in FIG. 7a, the input image is down-sampled 702, e.g., by a sheet generator prior to its being processed upon by the kernel K1 that is executing on the stencil processor that the sheet generator is coupled to. Alternatively, the kernel K1 may be programmed to perform the down-sampling.

In various embodiments, the stencil processor naturally creates output image sheets that have the same dimensions as the stencil processor's execution lane array. For example, in an embodiment where the execution lane array dimensions are 16 pixels×16 pixels, the construction of the stencil processor's kernel program code K1 initially defaults to the generation of 16 pixel×16 pixel output image sheets.

If the stencil processor is configured to generate output sheets of the same dimension as its execution lane array from input images that have been down-sampled, a large amount of buffering space is needed. For example, referring to FIG. 7a, if the down-sampling 702 is performed by the sheet generator to create a 16 pixel×16 pixel down-sampled sheet 703 for loading into the stencil processor's two dimensional shift register array, the sheet generator will need to queue an entire 32 pixel×32 pixel input image 701 in order to form the 16 pixel×16 pixel down-sampled input image 703 for consumption by the kernel K1. Allocating large amounts of memory needed for such queueing is a form of inefficiency.

As such, in an embodiment, a compiler will restructure the application software program (including, e.g., any pertinent configuration information) as depicted in FIG. 7b. Specifically, the compiler will structure the program code so that the kernel K1 does not operate with its execution lane array being fully utilized. Continuing with the present example, the kernel K1 is designed instead to operate on 8 pixel by 8 pixel input sheet 703b which causes the kernel K1 to generate an 8 pixel by 8 pixel output sheet 704b.

By configuring the kernel K1 to operate on the smaller 8 pixel by 8 pixel input sheet 703b, the down-sampling activity 702b (e.g., as performed by the sheet generator) need only queue half the amount of input image data 701b as compared to the input image data 701a of FIG. 7a. Here, whereas the input image data 701a of FIG. 1a corresponds to 32 rows of image data, by contrast, the input image data 701b of FIG. 7b corresponds to only 16 rows of input image data. With only 16 rows of input image data 701b, the down-sampling activity 702b is able to perform 2:1 down-sampling that produces a series of 8 pixel by 8 pixel input sheets 703b that span will span across the full width of the image.

FIGS. 8a and 8b show another inefficiency in which up-sampling is performed upon a kernel K1's output image data 801 and then down-sampling by a same amount is performed prior to execution upon the image data by K1's consuming kernel K2. Here, as observed in FIG. 8a, producing kernel K1 produces a series 801 of output sheets A0 through A3. The image data of these output sheets 801 are then interleaved to effectively up-sample K1's output. That is, as observed in FIG. 8a, e.g., a top line of each of output sheets A0 through A3 are interleaved to form a top output line of the up-sampled K1 output 803 that is stored in the line buffer 802 that temporarily queues K1's output data before it is consumed by K1's consuming kernel K2. In various embodiments, the up-sampling may be performed by any of K1, the sheet generator that is coupled to the stencil processor that K1 executes on or the line 802 buffer that K1 sends its output to.

As observed in FIG. 8b, the input processing for the kernel K2 that consumes K1's output is configured to down-sample its input by a same factor that K1's output was up-sampled. As such, the process of feeding K2 with properly sized input data requires reversing the up-sampling process that was performed on K1's output. That is, referring to FIG. 8b, the interleaved queued data 803 in the line buffer 802 is ultimately de-interleaved to reform the output images A0 through A3 that were originally formed by K1. The down-sampling may be performed by any of the line buffer 802, the sheet generator that is coupled to the stencil processor that K2 executes on, or K2 itself.

In an embodiment, a compiler is designed to recognize when a producing kernel's up-sampled output is down-sampled by a same factor (e.g., 1:2 upsample and 2:1 downsample) for a kernel that will consume the producing kernel's output (which may include multiple such kernels). In response, the compiler will further restructure the program code being developed so as to eliminate both the up-sampling and the down-sampling along the producer to consumer datapath. This solution is depicted in FIG. 8c. Here, K1's non up-sampled output is simply queued in the line buffer 802 that is coupled between the K1 and K2 connection. The non up-sampled K1 output is then fed to K2 directly without any down-sampling. As such, both the up-sampling activity of FIG. 8a and the down-sampling activity of FIG. 8b are both avoided.

FIGS. 9a and 9b pertain to another inefficiency that can arise, e.g., in the case of multi-component output images. As is known in the art, digital images can have multiple components (e.g., RGB, YUV, etc.). Various application software programs may be designed/configured to process the different components as different planes of data. Here, for example, a complete output image 901 may be fully generated by a producing kernel K1 by generating one or more sheets of data composed only of the first component (R), generating one or more sheets of data composed only of the second component (G), and generating one or more sheets of data of data composed only of a third component (B). In various embodiments, it may be natural or a standard default to queue all data of an image that is being passed between a producing kernel and a consuming kernel in a same line buffer 902. Thus, FIG. 9a shows image data of all three components 901 being queued in a same line buffer unit 902.

However, in the case of, e.g., large output images, storing the image data of all three components in a same line buffer unit may strain or otherwise consume large amounts of line buffer memory resources. Therefore in an embodiment, referring to FIG. 9b, a compiler that is compiling an application software program will automatically recognize when storing the different components of a multi-component image may strain line buffer memory resources. For instance, the compilation program may initially allocate a fixed amount of buffer memory resource to store and forward the images or may allocate an amount of buffer memory resource that is correlated to the size and or amount of data to be transferred and, in view of the allocation, may determine that the amount automatically allocated is insufficient or reaches some maximum threshold. In other approaches the compilation process may include simulating the application software program and recognizing that the line buffer unit is a bottleneck (e.g., it often does not have memory space to store a line group that has been generated by a producing kernel or it does not have the bandwidth to respond to read requests from a consuming kernel). In response, the compilation process automatically modifies the application software and/or reconfigures the image processor such that the different components of the producing K1 kernel's output image data are queued in different line buffer units. Here, FIG. 9b shows R, G and B image data being queued in different line buffer units 902_1, 902_2 and 902_3 respectively.

The solution of FIG. 9b can also be used in the case where the producing K1 kernel has many consumers. In this case, if the default solution of FIG. 9a is adopted, the single line buffer unit that is storing all components of the image data 901 may become a system bottleneck as the large numbers of consumers will need to load/read multiple times from the line buffer in order to receive all the information for a single input image. Therefore in an embodiment, the approach of FIG. 9b is adopted where each line buffer only holds the data for a same component type. In the example being discussed this will reduce the read requests made by the consumers upon a singular line buffer resource by 66% as compared to the default approach of FIG. 9a. That is, each of the line buffer units 902_1, 902_2, 902_3 of FIG. 9b will only need to support 33% of the consuming read load of line buffer unit 902 of FIG. 9a. A same reduced demand affect also occurs with respect to the write activity of the producing kernel's image data into the line buffer resources.

Another situation where the approach of FIG. 9b may reduce inefficiency is if certain consumers consume only a subset of the components. For example, in an extreme case, one consumer consumes the R component, another consumer consumes the G component and another consumer consumes the G component. In this case, each different consumer is configured with its own dedicated line buffer source which streamlines the different component based data flows along different data paths (through different line buffer unit connections). By contrast, if the approach of FIG. 9a is used, the different component based data flows will converge at the single point of line buffer 902 FIG. 9a in which case, the data flow of one component may be stalled because of the large amount of read and write activity at the line buffer unit 901 which is forwarding the other components.

FIGS. 10a and 10b show another efficiency improvement based on the spreading of line buffer resources downstream from a single consumer. Here, the existence of too many consumers may mandate the use of multiple line buffer units for forwarding a single producing kernel's output image data. FIG. 10a shows the potential inefficiency where four different consumers K2 through K5 are consuming a single producing K1 kernel's output from a single line buffer unit 1002. Again, the single line buffer unit 1002 may be bottleneck because it cannot purge its queued data until all consumers have consumed it. In this case, the overall data flow from the line buffer unit 1002 will at a minimum be reduced to the input rate of its slowest consumer. Moreover, the line buffer unit 1002 will receive a heavy load of read requests given the large numbers of consumers it supports which may overwhelm the resources of the line buffer unit 1002.

As such, as depicted in FIG. 10b, a first subset of consumers K2, K3 are assigned to a first line buffer unit 1002_1 and a second subset of consumers K4, K5 are assigned to a second line buffer unit 1002_2. The output image stream of the producing kernel K1 is fed to both line buffer units 1002_1, 1002_2. Spreading the total consumer load amongst multiple line buffer unit resources 1002_2, 1002_2 helps reduce total demand to any particular line buffer unit resource (as compared to the approach of FIG. 10a). Additionally, the compiler may be able to feed faster input stream consuming kernels with a same line buffer unit (and/or feed slower input stream consuming kernels with a different line buffer unit) so that faster consuming kernels are not stalled by the slower consumption rate of a slower input rate consuming kernel.

FIG. 11a shows a "split and join" inefficiency that may arise from application software programs (or components thereof) designed as a DAG. As observed in FIG. 11a the output of a source kernel K1 is fed to two different consuming kernels K2 and K3. Additionally kernel K3 consumes kernel K2's output. Kernel K3's dual dependencies from kernel K1's output can cause both runtime computational inefficiencies and modeling/design inefficiencies. With respect to runtime inefficiencies, the LB2 line buffer 1102_2 may need to be made very large in order to queue large amounts of K1's output data. Commonly, kernel K3 will not ask for a next line group from LB2 1102_2 until approximately when the next line group from LB3 1002_3 that kernel K3 is to process together with the next line group from LB2 1102_2 is available. Owing to the possibly large propagation delay through K2, LB2 1102_2 may become very large. The aforementioned disparity between when data in LB2 1102_2 is ready to be consumed and when its sibling input data to kernel K3 from K2 is available in LB3 1102_3 also can make modeling or optimization processes more difficult during the design of the application software.

FIG. 11b shows a solution in which a compiler forces a pipeline structure upon the split and join structure. Here, the K2 kernel of FIG. 11a is expanded into a different kernel K2' that includes the original K2 kernel plus a load/store algorithm 1103 that simply consumes content from LB1 1102_1 and forwards it to LB4 1102_4. Importantly, the load/store algorithm 1103 can induce some propagation delay to the un-processed stream from K1 that eliminates disparities between when original output data from K1 is ready for consumption by K3 and when output data from K2 is ready for consumption by K3 in LB3 1102_3.

Recall from the discussion of FIG. 3a that in various embodiments the scalar memory 303 may be configured to hold a look-up table or constant table. In certain applications, input image data that is processed by a kernel is a fixed constant rather than variable information (e.g., as generated by a source kernel that operates on varying input data). An example is lens shading correction in which corrective values for a lens are recorded, e.g., for different fairly large grain sized regions over the lens surface. The fairly large grain sizes correspond to a low resolution image data (if the recorded data is implemented as different entries where each entry corresponds to a different grain, the recorded data does not contain many entries).

When the image processor is processing images from a camera that includes the lens, one of these recorded corrective values corresponds to the image region being processed by the execution lane array. The recorded value is therefore applied to each execution lane as an input value. In this sense, the lens corrective values are implemented similarly to a look-up table or constant table. Additionally, with the total amount of data needed to implement the corrective values being limited, the corrective values do not consume a tremendous amount of memory space. As such, as observed in FIG. 12, in various embodiments, input image data 1210 that is fixed and small enough to fit in the scalar memory 1203 is loaded into scalar memory 1203 (e.g., as an initial configuration of the application software) and is referred to by the kernel that execute on the stencil processor's execution lane array during runtime as a look-up table or constant table (rather, e.g., than being generated by a source kernel and fed to the kernel through a line buffer unit).

FIG. 13a shows another runtime issue that may potentially lead to larger amounts of data being queued in a line buffer unit and/or sheet generator. Here, FIG. 13a depicts three line groups 1301, 1302, 1303 that, e.g., are queued in a sheet generator after being provided from a line buffer unit. For the sake of example, assume that each of the line groups 1301, 1302, 1303 contain 16 rows of image data and the dimensions 1305 of the execution lane array of the sheet generator's corresponding stencil processor is also 16 pixels×16 pixels. Additionally, assume that the dimensions 1306 of the two dimensional shift register array is 24 pixels×24 pixels to support a halo region that forms a 4 pixel wide border around the periphery of the execution lane array. Under these circumstances at least, a natural configuration may be to align the 16 rows of the execution lane array 1305 with the 16 rows of a particular line group. That is, the sheet generator forms sheets centered upon a particular line group. FIG. 13a shows this approach in which the execution lane 1305 is aligned to operate over the height of the second line group line group 1302.

A problem is that, as depicted in FIG. 13a, because of the existence of the halo 1306, complete sheets that are fed into the two dimensional shift register array will need data from a lower region of the first line group 1301 and an upper region of the third line group 1303 (the halo region covers these line groups as well). As such, in an embodiment, as depicted in FIG. 13b, the alignment is altered so that a minimal number of line groups need be present to form a full sized sheet. In this example, the alignment of FIG. 13b is shifted up by four pixel values relative to the alignment of FIG. 13a so that only two line groups 1301, 1302 need to be present in the sheet generator to form a fully sized sheet. By so doing, not only is less memory space needed in the sheet generator (and potentially the line buffer as well), but the sheet need only wait for two line groups to begin processing rather than wait for three line buffers to begin processing.

FIG. 14 pertains to a de-interleaving process performed by a sheet generator as an input process for a kernel that is fed input image data that includes multiple pixels per data lane or, said another way, the fundamental unit of data to be processed by the sheet generator's kernel includes multiple pixels. As an example, FIG. 14 shows the pixels of an input image that are received by a sheet generator as being structured to contain a mosaic 1401 of different colored pixels, e.g., in a Bayer pattern format. Here, the input image is received by the sheet generator as line groups provided by a line buffer unit. As such, for example, each row of each line group received by the sheet generator contains R, G and B pixels. Here, the fundamental unit of the input image's data includes a unit cell 1402 of four pixels that includes an R pixel, a B pixel and two G pixels.

The sheet generator, rather than simply parse sheets from the received input image structure 1401 directly (which would create sheets having the Bayer pattern), instead performs a de-interleaving process on the input image data structure 1401 to generate a new input structure 1403 for the kernel that includes four different types of sheets. That is, as observed in FIG. 14, the new input structure 1403 includes: 1) sheets composed only of or otherwise only derived from R pixels of the input image; 2) sheets composed only of or otherwise only derived from G pixels positioned in a same first position of the unit cell input image's unit cell; 3) sheets composed only of or otherwise only derived from G pixels positioned in a same second position of the unit cell input image's unit cell; 4) sheets composed only of or otherwise only derived from B pixels of the input image. The sheets may be composed only of input image pixels or may be up-sampled, e.g., by interpolating values into input image locations where different colors are located.

The newly structured sheets are then provided to the sheet generator's associated kernel which processes them and generates output sheets of the same structure 1403 (one color per sheet) which are provided back to the sheet generator. The sheet generator then performs an interleaving process on the monochromatic structure 1403 to generate an output image for consumption having the original structure 1401 that includes a unit cell of mixed colors.

In various embodiments, the aforementioned line buffers or line buffer units may more generally be characterized as buffers that store and forward image data between producing and consuming kernels. That is, in various embodiments, a buffer need not necessarily queue line groups. Additionally, the hardware platform of the image processor may include a plurality of line buffer units having associated memory resources and one or more line buffers may be configured to operate from a single line buffer unit. That is, a single line buffer unit in hardware may be configured to store and forward different image data flows between different producing/consuming kernel pairs.

FIG. 15 shows a method described above. The method includes constructing an image processing software data flow in which a buffer stores and forwards image data being transferred from a producing kernel to one or more consuming kernels 1501. The method also includes recognizing that the buffer has insufficient resources to store and forward the image data 1502. The method also includes modifying the image processing software data flow to include multiple buffers that store and forward the image data during the transfer of the image data from the producing kernel to the one or more consuming kernels 1503.

3.0 Construction of Low Level Program Code

FIG. 16 shows a pre-runtime development environment in which a programmer designs a high level image processing function and the application development environment provides for any/all of the aforementioned transformations of section 2.0 so that the developer does not have to identify the inefficient and/or write the transformation from scratch.

Here, the development environment automatically recognizes any of the inefficiencies described above and automatically imposes the corresponding transformational improvement by, e.g., referring to a library 1601 that contains descriptions of inefficiencies (which the development environment scans the program code being developed for inclusion of) and corresponding fixes (that are imposed if an inefficiency is discovered). That is, the development environment automatically inserts program code from the library 1601 that performs the more efficient process (e.g., as part of a compilation process) or otherwise modifies the program code to replace the inefficient code with new code that includes a fix to the inefficiency.

Thus, the program code that performs the above described operations or alternate embodiments thereof may be expressed in higher level program code or lower level object code. In various embodiments, a higher level virtual instruction set architecture (ISA) code may specify data values to be operated upon as memory reads having x,y address coordinates, while, the object code may instead comprehend these data accesses as two-dimensional shift register operations (such as any of the shift operations described above or similar embodiments).

A compiler may convert the x,y reads in the development environment into corresponding shifts of the two dimensional shift register that are specified object code (e.g., a read in the development environment having x,y coordinates (+2, +2) may be realized in object code as a shift to the left two spaces and a shift down of two spaces). Depending on environment, the developer may have visibility into both of these levels (or, e.g., just the higher virtual ISA level). In still yet other embodiments, such prewritten routines may be invoked during runtime (e.g., by a just-in-time compiler) rather than pre-runtime.

4.0 Concluding Statements

From the preceding sections is pertinent to recognize that an image processor as described above in Section 1.0 may be embodied in hardware on a computer system (e.g., as part of a handheld device's System on Chip (SOC) that processes data from the handheld device's camera).

It is pertinent to point out that the various image processor architecture features described above are not necessarily limited to image processing in the traditional sense and therefore may be applied to other applications that may (or may not) cause the image processor to be re-characterized. For example, if any of the various image processor architecture features described above were to be used in the creation and/or generation and/or rendering of animation as opposed to the processing of actual camera images, the image processor may be characterized as a graphics processing unit. Additionally, the image processor architectural features described above may be applied to other technical applications such as video processing, vision processing, image recognition and/or machine learning. Applied in this manner, the image processor may be integrated with (e.g., as a co-processor to) a more general purpose processor (e.g., that is or is part of a CPU of computing system), or, may be a stand alone processor within a computing system.

The hardware design embodiments discussed above may be embodied within a semiconductor chip and/or as a description of a circuit design for eventual targeting toward a semiconductor manufacturing process. In the case of the later, such circuit descriptions may take of the form of a (e.g., VHDL or Verilog) register transfer level (RTL) circuit description, a gate level circuit description, a transistor level circuit description or mask description or various combinations thereof. Circuit descriptions are typically embodied on a computer readable storage medium (such as a CD-ROM or other type of storage technology).

From the preceding sections is pertinent to recognize that an image processor as described above may be embodied in hardware on a computer system (e.g., as part of a handheld device's System on Chip (SOC) that processes data from the handheld device's camera). In cases where the image processor is embodied as a hardware circuit, note that the image data that is processed by the image processor may be received directly from a camera. Here, the image processor may be part of a discrete camera, or, part of a computing system having an integrated camera. In the case of the later the image data may be received directly from the camera or from the computing system's system memory (e.g., the camera sends its image data to system memory rather than the image processor). Note also that many of the features described in the preceding sections may be applicable to a graphics processor unit (which renders animation).

FIG. 17 provides an exemplary depiction of a computing system. Many of the components of the computing system described below are applicable to a computing system having an integrated camera and associated image processor (e.g., a handheld device such as a smartphone or tablet computer). Those of ordinary skill will be able to easily delineate between the two.

As observed in FIG. 17, the basic computing system may include a central processing unit 1701 (which may include, e.g., a plurality of general purpose processing cores 1715_1 through 1715_N and a main memory controller 1717 disposed on a multi-core processor or applications processor), system memory 1702, a display 1703 (e.g., touchscreen, flat-panel), a local wired point-to-point link (e.g., USB) interface 1704, various network I/O functions 1705 (such as an Ethernet interface and/or cellular modem subsystem), a wireless local area network (e.g., WiFi) interface 1706, a wireless point-to-point link (e.g., Bluetooth) interface 1707 and a Global Positioning System interface 1708, various sensors 1709_1 through 1709_N, one or more cameras 1710, a battery 1711, a power management control unit 1724, a speaker and microphone 1713 and an audio coder/decoder 1714.

An applications processor or multi-core processor 1750 may include one or more general purpose processing cores 1715 within its CPU 1701, one or more graphical processing units 1716, a memory management function 1717 (e.g., a memory controller), an I/O control function 1718 and an image processing unit 1719. The general purpose processing cores 1715 typically execute the operating system and application software of the computing system. The graphics processing units 1716 typically execute graphics intensive functions to, e.g., generate graphics information that is presented on the display 1703. The memory control function 1717 interfaces with the system memory 1702 to write/read data to/from system memory 1702. The power management control unit 1724 generally controls the power consumption of the system 1700.

The image processing unit 1719 may be implemented according to any of the image processing unit embodiments described at length above in the preceding sections. Alternatively or in combination, the IPU 1719 may be coupled to either or both of the GPU 1716 and CPU 1701 as a co-processor thereof. Additionally, in various embodiments, the GPU 1716 may be implemented with any of the image processor features described at length above.

Each of the touchscreen display 1703, the communication interfaces 1704-1707, the GPS interface 1708, the sensors 1709, the camera 1710, and the speaker/microphone codec 1713, 1714 all can be viewed as various forms of I/O (input and/or output) relative to the overall computing system including, where appropriate, an integrated peripheral device as well (e.g., the one or more cameras 1710). Depending on implementation, various ones of these I/O components may be integrated on the applications processor/multi-core processor 1750 or may be located off the die or outside the package of the applications processor/multi-core processor 1750.

In an embodiment one or more cameras 1710 includes a depth camera capable of measuring depth between the camera and an object in its field of view. Application software, operating system software, device driver software and/or firmware executing on a general purpose CPU core (or other functional block having an instruction execution pipeline to execute program code) of an applications processor or other processor may perform any of the functions described above. Here, many components of the computing system of FIG. 17 may be present within a higher performance computing system (e.g., a server) that executes program code that corresponds to the application development environment of FIG. 16 including a compiler that performs any/all of the transformations described above.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the elements may be downloaded as a computer program transferred from a remote computer (e.g., a server) to a requesting computer (e.g., a client) by way of data signals embodied in a carrier wave or other propagation medium via a communication link (e.g., a modem or network connection).

In the foregoing specification, specific example embodiments have been described. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. One or more non-transitory computer storage media encoded with computer program instructions that when executed by one or more computers cause the one or more computers to perform operations comprising:
   receiving a definition of an image processing software data flow for execution by an image processor, the image processing software data flow having instructions for a kernel to be executed by an image processing core of the image processor, the image processing core having an execution lane array, wherein the kernel when executed causes the image processing core to read an input sheet of image data and to generate an output sheet of image data having the same dimensions as the execution lane array of the image processor;
   determining that the image processing software data flow specifies downsampling the input sheet of image data stored in a linebuffer before being processed by the image processing core executing the kernel; and
   in response, modifying instructions of the image processing software data flow to cause the linebuffer to store less than the input sheet of image data and cause the kernel to process a portion of the input sheet of image data with less than all execution lanes of the execution lane array.

2. The one or more non-transitory computer storage media of claim 1, wherein the image processor comprises a plurality of stencil processors, each of the plurality of stencil processors being configured to execute a respective kernel, and wherein at least one of the plurality of stencil processors includes an associated memory to store constant information, the operations further comprising:
   storing, in the associated memory of the at least one of the plurality of stencil processors, constant input image data, wherein the instructions for the respective kernel cause the respective kernel to read the constant input image data.

3. The one or more non-transitory computer storage media of claim 1, wherein the image processor comprises a plurality of stencil processors, each of the plurality of stencil processors being configured to execute a respective kernel, the operations comprising:
   determining that input image data for at least one of the plurality of stencil processors comprises groups of lines of image data; and
   aligning the execution lane array of the at least one of the plurality of stencil processors with the input image data such that the execution lane array overlaps a minimal number of the groups of lines of image data.

4. The one or more non-transitory computer storage media of claim 1, wherein the image processor comprises a plurality of stencil processors, each of the plurality of stencil processors being configured to execute a respective kernel, the operations comprising:
   determining that input image data for at least one of the plurality of stencil processors comprises a mosaic of multiple pixels per unit of data; and
   generating, from the input image data, multiple input sheets of image data by performing a de-interleaving process on the input image data.

5. The one or more non-transitory computer storage media of claim 4, the operations comprising:
   generating, from multiple output sheets of image data generated by the respective kernel of the at least one of the plurality of stencil processors, output image data comprising the mosaic of multiple pixels per unit of data by performing an interleaving process on the multiple output sheets of image data.

6. The one or more non-transitory computer storage media of claim 4, wherein each sheet of the multiple input sheets of image data comprises a sheet of image data for one pixel color.

7. The one or more non-transitory computer storage media of claim 5, wherein each sheet of the multiple output sheets of image data comprises a sheet of image data for one pixel color.

8. The one or more non-transitory computer storage media of claim 1, wherein processing, by the kernel, a portion of the input sheet of image data with less than all execution lanes of the execution lane array causes the kernel to generate an output sheet of image data having smaller dimensions than the dimensions of the execution lane array.

9. The one or more non-transitory computer storage media of claim 3, wherein the minimal number of the groups of lines of image data comprises the minimum number of the groups of lines of image data that are needed to form a full sized input sheet of image data.

10. The one or more non-transitory computer storage media of claim 9, wherein the full sized input sheet of image data comprises a sheet of image data having the same dimensions as the execution lane array.

11. The one or more non-transitory computer storage media of claim 1, wherein the image processor comprises a plurality of stencil processors, and wherein the operations further comprise assigning each kernel of multiple kernels to be executed by a respective stencil processor of the plurality of stencil processors.

12. The one or more non-transitory computer storage media of claim 11, wherein each stencil processor has an associated sheet generator, and wherein the instructions of each kernel cause a respective sheet generator to load data from a corresponding linebuffer.

13. The one or more non-transitory computer storage media of claim 12, wherein loading, by a sheet generator, the data from the corresponding linebuffer comprises loading data into a two-dimensional shift-register array of a stencil processor of the plurality of stencil processors.

14. The one or more non-transitory computer storage media of claim 1, wherein the image processing software data flow is expressed in higher-level program code, and wherein the operations further comprise generating lower-level object code implementing the modified image processing software data flow.

15. A computing system, comprising:
one or more general purpose processing cores;
a system memory;
a memory controller coupled between the system memory and the one or more general purpose processing cores; and
one or more non-transitory computer storage media encoded with computer program instructions that when executed by the one or more general purpose processing cores cause the one or more general purpose processing cores to perform operations comprising:
receiving a definition of an image processing software data flow for execution by an image processor, the image processing software data flow having instructions for a kernel to be executed by an image processing core of the image processor, the image processing core having an execution lane array, wherein the kernel when executed causes the image processing core to read an input sheet of image data and to generate an output sheet of image data having the same dimensions as the execution lane array of the image processor;
determining that the image processing software data flow specifies downsampling the input sheet of image data stored in a linebuffer before being processed by the image processing core executing the kernel; and
in response, modifying instructions of the image processing software data flow to cause the linebuffer to store less than the input sheet of image data and cause the kernel to process a portion of the input sheet of image data with less than all execution lanes of the execution lane array.

16. The system of claim 15, wherein the image processor comprises a plurality of stencil processors, each of the plurality of stencil processors being configured to execute a respective kernel, and wherein at least one of the plurality of stencil processors includes an associated memory to store constant information, the operations further comprising:
storing, in the associated memory of the at least one of the plurality of stencil processors, constant input image data, wherein the instructions for the respective kernel cause the respective kernel to read the constant input image data.

17. The system of claim 15, wherein the image processor comprises a plurality of stencil processors, each of the plurality of stencil processors being configured to execute a respective kernel, the operations comprising:
determining that input image data for at least one of the plurality of stencil processors comprises groups of lines of image data; and
aligning the execution lane array of the at least one of the plurality of stencil processors with the input image data such that the execution lane array overlaps a minimal number of the groups of lines of image data.

18. The system of claim 15, wherein the image processor comprises a plurality of stencil processors, each of the plurality of stencil processors being configured to execute a respective kernel, the operations comprising:
determining that input image data for at least one of the plurality of stencil processors comprises a mosaic of multiple pixels per unit of data; and
generating, from the input image data, multiple input sheets of image data by performing a de-interleaving process on the input image data.

19. The system of claim 18, the operations comprising:
generating, from multiple output sheets of image data generated by the respective kernel of the at least one of the plurality of stencil processors, output image data comprising the mosaic of multiple pixels per unit of data by performing an interleaving process on the multiple output sheets of image data.

20. A method performed by one or more computers, the method comprising:
receiving a definition of an image processing software data flow for execution by an image processor, the image processing software data flow having instructions for a kernel to be executed by an image processing core of the image processor, the image processing core having an execution lane array, wherein the kernel when executed causes the image processing core to read an input sheet of image data and to generate an output sheet of image data having the same dimensions as the execution lane array of the image processor;
determining that the image processing software data flow specifies downsampling the input sheet of image data stored in a linebuffer before being processed by the image processing core executing the kernel; and
in response, modifying instructions of the image processing software data flow to cause the linebuffer to store less than the input sheet of image data and cause the kernel to process a portion of the input sheet of image data with less than all execution lanes of the execution lane array.

* * * * *